United States Patent
Jung-Kubiak et al.

(10) Patent No.: US 10,384,810 B2
(45) Date of Patent: Aug. 20, 2019

(54) MICRO-EMITTERS FOR ELECTROSPRAY SYSTEMS

(71) Applicant: California Institute of Technology, Pasadena, CA (US)

(72) Inventors: Cecile Jung-Kubiak, Glendale, CA (US); Colleen M. Marrese-Reading, Valencia, CA (US); Victor E. White, Altadena, CA (US); Daniel W. Wilson, Montrose, CA (US); Matthew R. Dickie, Long Beach, CA (US); Karl Y. Yee, Pasadena, CA (US); Richard E. Muller, Altadena, CA (US); James E. Polk, Pasadena, CA (US); John R. Anderson, Tujunga, CA (US); Nima Rouhi, Pasadena, CA (US); Frank Greer, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 927 days.

(21) Appl. No.: 14/800,436

(22) Filed: Jul. 15, 2015

(65) Prior Publication Data
US 2018/0201395 A1     Jul. 19, 2018

Related U.S. Application Data

(60) Provisional application No. 62/024,815, filed on Jul. 15, 2014.

(51) Int. Cl.
*B64G 1/40*     (2006.01)

(52) U.S. Cl.
CPC .................................. *B64G 1/405* (2013.01)

(58) Field of Classification Search
CPC ............ B81C 1/00; B64G 1/405; F03H 1/005
See application file for complete search history.

(56) References Cited

U.S. PATENT DOCUMENTS

| 4,328,667 A | 5/1982 | Valentian et al. |
| 6,097,139 A | 8/2000 | Tuck et al. |
| 6,516,024 B1 | 2/2003 | Dupuis et al. |
| 6,516,604 B2 | 2/2003 | Mojarradi |
| 6,531,811 B1 | 3/2003 | Kudo et al. |

(Continued)

FOREIGN PATENT DOCUMENTS

| GB | 2370519 | 7/2002 |
| WO | 2011079138 A2 | 6/2011 |
| WO | 2011079138 A3 | 12/2011 |

OTHER PUBLICATIONS

Lenguito "Scaling up the power of an electrospray microthruster" 2014.*

(Continued)

*Primary Examiner* — Gerald L Sung
*Assistant Examiner* — William L Breazeal
(74) *Attorney, Agent, or Firm* — KPPB LLP

(57) ABSTRACT

Micro-emitter arrays and methods of microfabricating such emitter arrays are provided. The microfabricated emitter arrays incorporate a plurality of emitters with heights greater than 280 microns with uniformity of +/−10 microns arranged on a supporting silicon substrate, each emitter comprising an elongated body extending from the top surface of the substrate and incorporating at least one emitter tip on the distal end of the elongated body thereof. The emitters may be disposed on the substrate in an ordered array in an X by Y grid pattern, wherein X and Y can be any number greater than zero. The micro-emitter arrays may utilize a LMIS propellant source including, for example, gallium, indium, bismuth, or tin. The substrate may incorporate at least one through-via providing a fluid pathway for the LMIS propellant to flow from a propellant reservoir beneath the substrate to the top substrate surface whereupon the micro-emitter array is disposed.

16 Claims, 28 Drawing Sheets

(56) References Cited

U.S. PATENT DOCUMENTS

| | | | |
|---|---|---|---|
| 6,741,025 B2 | 5/2004 | Tuck et al. | |
| 6,996,972 B2 | 2/2006 | Song | |
| 7,059,111 B2 | 6/2006 | King | |
| 7,238,952 B2 | 7/2007 | Ohtsuka | |
| 7,297,943 B2 | 11/2007 | Tai et al. | |
| 7,827,779 B1 | 11/2010 | Krishnan et al. | |
| 8,850,792 B2 | 10/2014 | Marrese-Reading et al. | |
| 2002/0023427 A1 | 2/2002 | Mojarradi | |
| 2008/0072565 A1 | 3/2008 | Bekey | |
| 2008/0083744 A1 | 4/2008 | Ruiz | |
| 2009/0113872 A1 | 5/2009 | Demmons et al. | |
| 2009/0278434 A1 | 11/2009 | Holland et al. | |
| 2012/0144796 A1* | 6/2012 | Marrese-Reading | B64G 1/405 60/202 |
| 2016/0010631 A1* | 1/2016 | King | B05B 5/0255 60/202 |

OTHER PUBLICATIONS

Velasquez-Garcia "A Planar Array of Micro-Fabricated Electrospray Emitters for Thruster Applications" 2006.*

Si "Experimental and theoretical study of a cone-jet for an electrospray microthruster considering the interference effect in an array of nozzles" 2007.*

Courtney "Electrochemical Micromachining on Porous Nickel for Arrays of Electrospray Ion Emitters" 2013.*

Genovese et al., AIAA 2004-3620 AIAA/ASME/SAE/ASEE Joint Propulsion Conference and Exhibit, Jul. 2004.

Ziemer et al., AIA 2008-4826, 44th AIAA/ASME/SAE/ASEE Joint Propulsion Conference and Exhibit, Jul. 2008.

International Search Report and Written Opinion for International Application PCT/US2010/061616; Report completed May 4, 2011, dated Oct. 28, 2011, 9 pgs.

International Preliminary Report on Patentability for International Application PCT/US2010/061616; dated Jun. 25, 2012, 9 pgs.

Bell et al., "The Influence of substrate Geometry on the Emission Properties of a Liquid Metal Ion Source", Appl. Phys. A, 1986, vol. 41, pp. 335-346.

Tajmar et al., "Indium Field Emission Electric Propulsion Microthruster Experimental Characterization", Journal of Propulsion and Power, Mar.-Apr. 2004, vol. 20, No. 2, pp. 211-218.

* cited by examiner

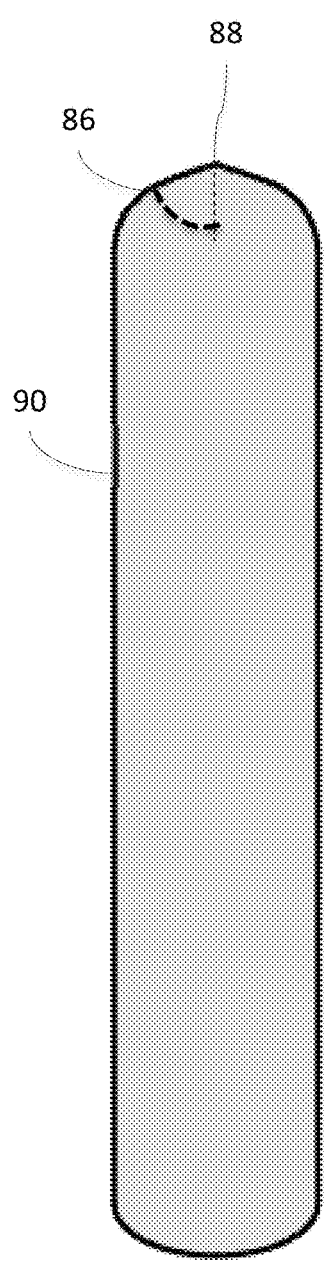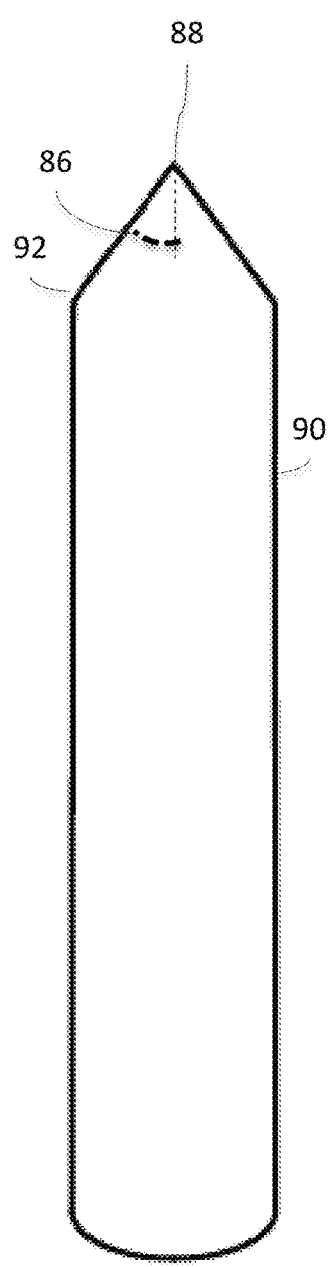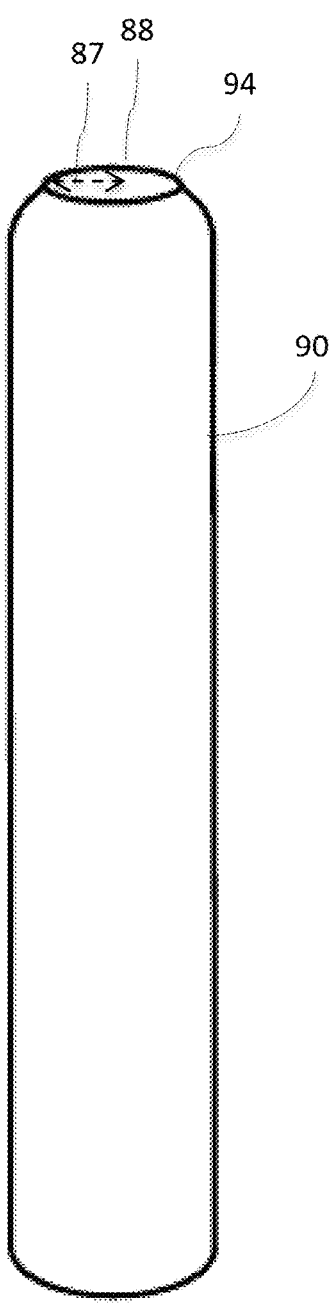

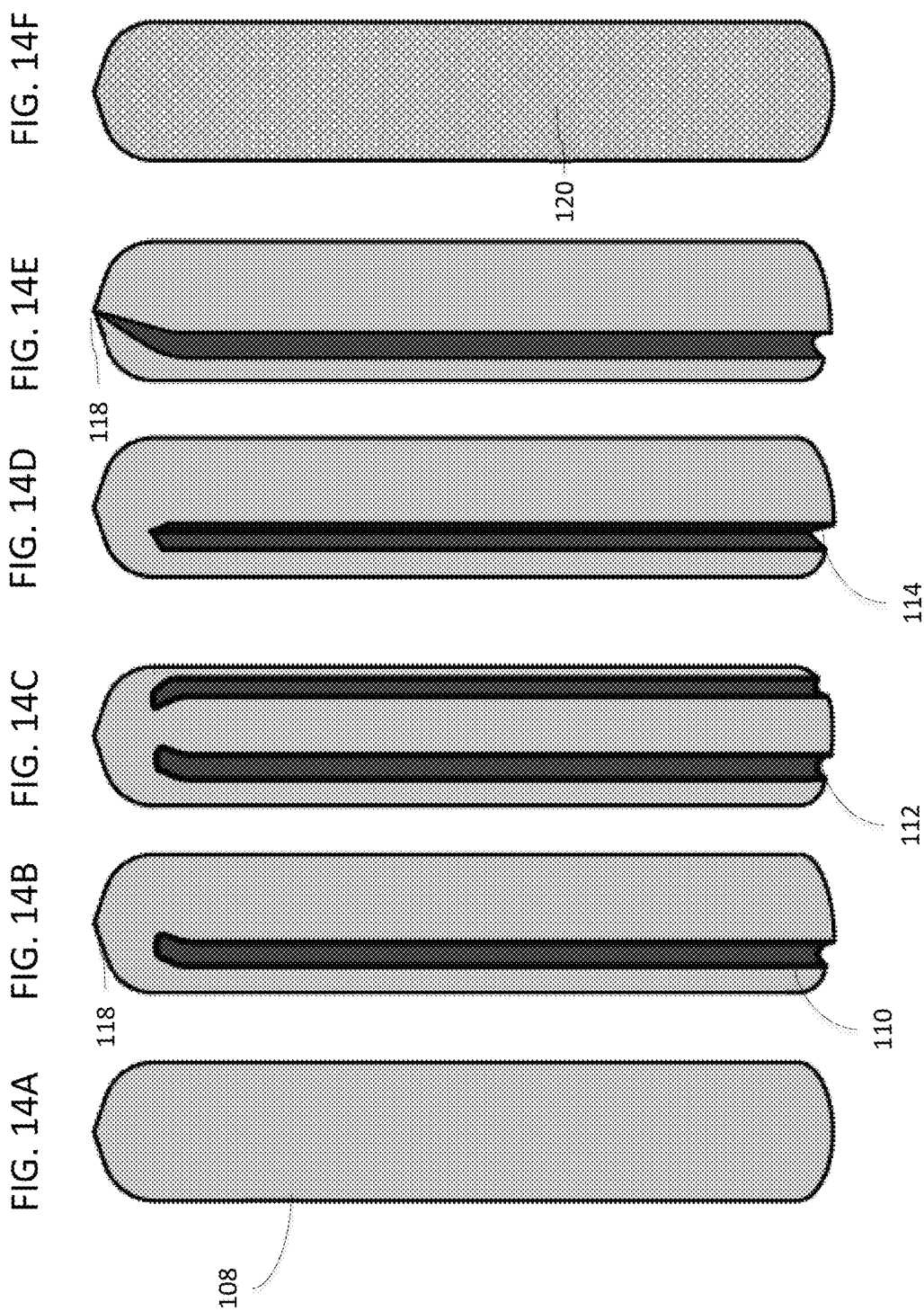

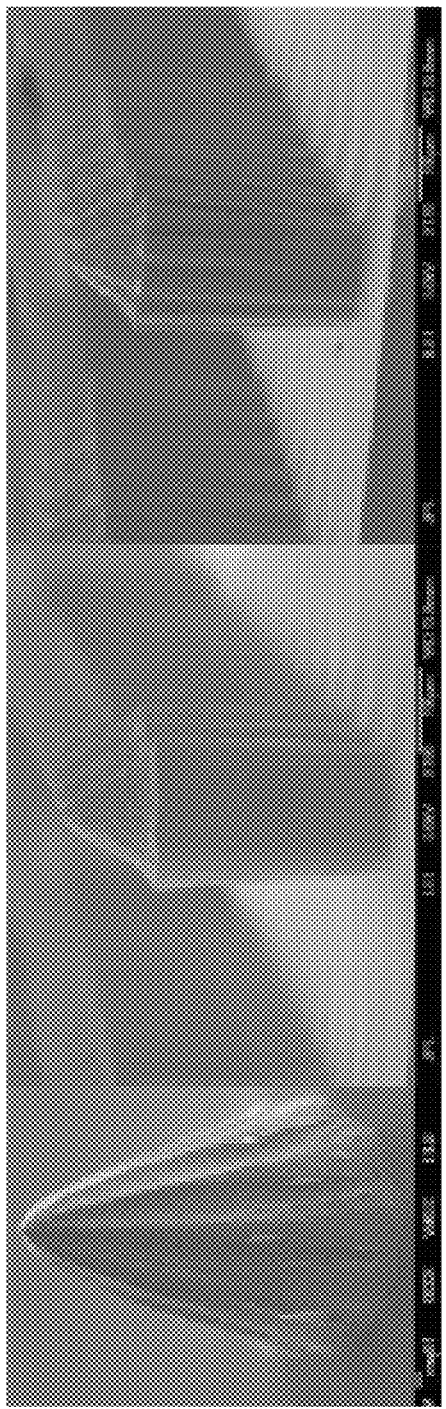
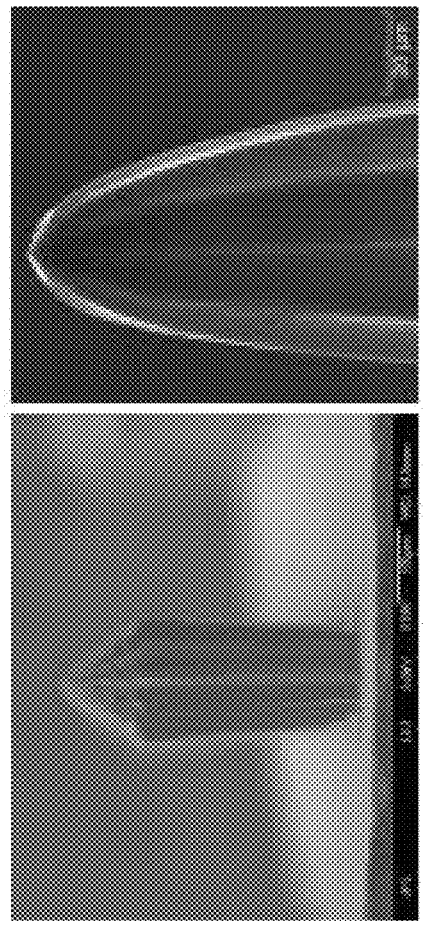
FIG. 20A  FIG. 20B  FIG. 20C  FIG. 20D  FIG. 20E

Prior Art

MICRO-EMITTERS FOR ELECTROSPRAY SYSTEMS

RELATED APPLICATIONS

This application claims priority to U.S. Provisional Application 62/024,815 filed Jul. 15, 2015, which is incorporated by reference herein in its entirety

STATEMENT REGARDING FEDERALLY SPONSORED RESEARCH

The invention described herein was made in the performance of work under a NASA contract, and is subject to the provisions of Public Law 96-517 (35 USC 202) in which the Contractor has elected to retain title.

FIELD OF THE INVENTION

This disclosure is generally directed to microfabricated emitters (micro-emitters) and arrays of micro-emitters for use in electrospray systems with externally wetted emitter elements for use in propulsion, metal deposition and ion etching sources, and their method of manufacture.

BACKGROUND

Miniaturized satellites, such as cubesats, are increasingly being used for information transmission and space exploration. Compared to conventional satellites, miniaturized satellites reduce the largest cost associated with space exploration: the cost of spacecraft deployment. With proper propulsion and control, these miniaturized satellites have the capability to explore Earth, asteroids and other planets with significantly lower cost and greater maneuverability.

Conventional satellites typically incorporate chemical thrusters that utilize liquid propellants such as Hydrazine and Aerozine-50 for propulsion. However, the exhaust velocity of such chemical thrusters is limited by the inherent specific energy released by combustion and thus chemical propulsion uses propellant more inefficiently than electric propulsion. In addition, the propellant reservoirs and feed systems for chemical thrusters are large and heavy, rendering them incompatible with miniaturized satellite and small spacecraft propulsion.

A potential solution to the complexities of chemical propulsion is the electrospray thruster, which is a form of electric propulsion that creates thrust from liquid propellants by ejecting and accelerating charged particles. In these thrusters the charged ions are accelerated by electrostatic forces. Electrospray thrusters utilizing field-emission electric propulsion (FEEP) are more efficient than conventional electrostatic ion or Hall effect thrusters. In addition, FEEP thrusters have the potential to scale down or up in size, mass, and thrust range to propel miniaturized or conventional sized spacecraft. Because of their low thrust level capability, FEEP thrusters are most useful for micro-newton to milli-newton propulsion applications for high velocities on small spacecraft and for precision pointing small and large spacecraft.

FEEP electrospray thrusters create high exhaust velocities on the order of thousands of meters per second utilizing high voltages. Electrospray thruster devices essentially consist of an emitter, an extractor electrode, a heater, an isolator, a propellant reservoir, and, in some instances, an accelerator electrode. In many of these systems the emitter is an externally wetted needle or an internally wetted capillary tube. A potential difference of the order of 2-10 kV is applied to generate a strong electric field at the tip of the emitter. Voltages just above a threshold draw the liquid propellant into a Taylor cone and extract charged particles at the apex of the cone. The charged particles are then accelerated to high velocities on the order of tens of kilometers per second by the applied electric field. To balance the charge loss, a separate negatively charged particle source is used to neutralize the ions and spacecraft charge imbalance. This process of creating and accelerating charged particles is very efficient, with reported beam efficiencies of greater than 90%.

Several different liquid propellants, including liquid metals, may be used to wet the FEEP thruster emitters to generate charged droplet beams. Typical liquid metal ion sources (LMIS) may include gallium, indium, gold and alkali metals or alloys. In some cases the propellant is stored as a solid, melted to flow, and then pulled up the emitter tip by capillary forces. These propellants can be used in both ion and droplet emission modes for electric thrusters operating at high and low specific impulse.

BRIEF SUMMARY OF THE INVENTION

Many embodiments are directed to microfabricated emitters and arrays of microfabricated emitters for use in microfluidic electrospray thrusters, and methods of their manufacture.

Some embodiments are directed to micro-emitter arrays including:
- a substrate having top and bottom surfaces;
- a plurality of emitters disposed on the top surface of the substrate, each of the emitters formed of an elongated body having a first end disposed proximal to the top surface of the substrate and a second end disposed distal the top surface of the substrate, wherein the apex of the second end forms a tip portion;
- an extractor grid having a plurality of thrust emission openings disposed above the tip portions of the plurality of emitters and separated therefrom by an extractor gap, the extractor grid configured to apply an extraction voltage to the micro-emitter array;
- a source of propellant in fluid communication with the plurality of emitters, wherein the propellant flows from the source up the elongated bodies of the plurality of emitters and is ejected from the tip portions thereof when the extraction voltage is applied to the emitters;
- wherein the elongated bodies of the emitters have a height such that the electric field strength supplied by the extractor grid is at least one order of magnitude greater at the tip portion of the elongated bodies than at the first end of the elongated bodies;
- wherein the tip portions of each of the elongated bodies of the micro-emitter array have a conformation such that a single Taylor cone forms on the distal apex of at least a majority of the emitters when the extraction voltage is applied across the micro-emitter array; and
- wherein the heights of each of the elongated bodies of the micro-emitter array have a minimal variance there between such that when the extraction voltage is applied across the micro-emitter array Taylor cones are formed on the tip portions of a majority of the emitter needles, the Taylor cones emitting a propellant jet having an emission profile such that the emitted propellant from each of the emitters is directed through the corresponding emission opening on the extractor grid.

In other embodiments the wall angle formed between the side wall of the elongated body of each of the emitter needles and the top surface of the substrate is sufficiently perpendicular to allow maximum packing density of the plurality of emitter needles on the substrate surface.

In still other embodiments the wall angle is from between about 65 to 90 degrees.

In yet other embodiments the spacing distance between adjacent emitter needles is sufficiently large to prevent interference of the propellant disposed on the adjacent emitter needles.

In still yet other embodiments the distal tip portion of each of the elongated bodies comprises an angular tip having a tip half-angle of greater than 49 degrees. In some such embodiments the tip half-angle is about 55 degrees with a variance of plus or minus 5 degrees.

In still yet other embodiments the tip portion of each of the elongated bodies is substantially flat. In some such embodiments the second ends of each of the elongated bodies has a radius of between 1 and 5 microns.

In still yet other embodiments each of the elongated bodies further comprise at least one elongated groove that extend axially from the first end of the elongated bodies at least partially up the side walls of the elongated bodies. In some such embodiments the at least one groove has a groove angle of from 40 to 120 degrees. In other such embodiments the at least one groove extends from the first end to the tip portion apex of each of the elongated bodies. In still other such embodiments the at least one groove has one of either a "V" or a rounded shaped cross-section. In yet other such embodiments the at least one groove has a depth of at least 2 to 30 microns. In still yet other such embodiments the elongated bodies comprise a plurality of grooves.

In still yet other embodiments the height of the elongated bodies is at least 280 microns.

In still yet other embodiments the variance in the heights of the elongated bodies is no greater than ±10 microns.

In still yet other embodiments the array further includes a plurality of fluid passages formed between the top and the bottom surfaces of the substrate.

Some other embodiments are directed to methods of manufacturing a micro-emitter array including:
  providing a substrate having top and bottom surfaces;
  depositing an oxide layer thereon;
  lithographically mapping a plurality of emitters on the top surface of the substrates; and
  etching the plurality of emitters to formed a plurality of elongated bodies having a first end disposed proximal to the top surface of the substrate and a second end disposed distal the top surface of the substrate, wherein the apex of the second end forms a tip portion;
  positioning an extractor grid having a plurality of thrust emission openings above the tip portions of the plurality of emitters and separated therefrom by an extractor gap, the extractor grid configured to apply an extraction voltage to the micro-emitter array;
  placing a source of propellant in fluid communication with the plurality of emitters, such that the propellant is configured to flow from the source up the elongated bodies of the plurality of emitters and is ejected from the tip portions thereof when the extraction voltage is applied to the emitters;
  wherein the elongated bodies of the emitters have a height such that the electric field strength supplied by the extractor grid is at least one order of magnitude greater at the tip portion of the elongated bodies than at the first end of the elongated bodies;
  wherein the tip portions of each of the elongated bodies of the micro-emitter array have a conformation such that a single Taylor cone forms on the distal apex of at least a majority of the emitters when the extraction voltage is applied across the micro-emitter array; and
  wherein the heights of each of the elongated bodies of the micro-emitter array have a minimal variance there between such that when the extraction voltage is applied across the micro-emitter array Taylor cones are formed on the tip portions of a majority of the emitter needles, the Taylor cones emitting a propellant jet having an emission profile such that the emitted propellant from each of the emitters is directed through the corresponding emission opening on the extractor grid.

In other embodiments the oxide is at least 5 microns thick.

In still other embodiments the lithography uses a grey-scale lithographic process. In some such embodiments the lithography uses a polymethylglutarimide resist material.

In yet other embodiments the etching uses a deep reactive ion etching process. In some such embodiments the deep reactive ion etching process uses a combination of etching gases comprising $SF_6$, $C_4F_8$, and Ar.

In still yet other embodiments the method further includes cleaning the etched array with acetone and isopropanol and further etching with $O_2$ plasma.

In still yet other embodiments the method further includes forming a plurality of fluid passages from the bottom to the top surface of the substrate. In some such embodiments the fluid passages are formed by a combination of oxide and nitride layering followed by photolithography and one of either plasma or chemical etching. In some other such embodiments the etching uses a combination of gasses comprising $CHF_3$ and $O_2$. In still other such embodiments the etched oxide layer is etched down to the silicon substrate with an aqueous HF wet etch. In yet other such embodiments the exposed silicon substrate is etched through using a hydroxide solution.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiment of the disclosure and should not be construed as a complete recitation of the scope of the disclosure, wherein:

FIG. 9A provides a schematic of an emitter tip with a half-angle approximately 49° in accordance with embodiments of the invention.

FIG. 9B provides a schematic of an emitter tip with a half-angle approximately 60° in accordance with embodiments of the invention.

FIG. 9C provides a schematic of an emitter tip with a flat top surface in accordance with embodiments of the invention.

FIGS. 14A to 14F provide schematics of emitters with various surface textures and structures in accordance with the invention: A) smooth, B) one axial rounded groove, C) a plurality of axial rounded grooves, D) one axial V-shaped groove, E) one axial rounded groove that extends from the emitter base to the cone tip apex, and F) roughened.

FIGS. 20a to 20e provide SEM images of exemplary embodiments of emitters and emitter arrays in accordance with embodiments of the invention.

DETAILED DESCRIPTION

Figure 1:
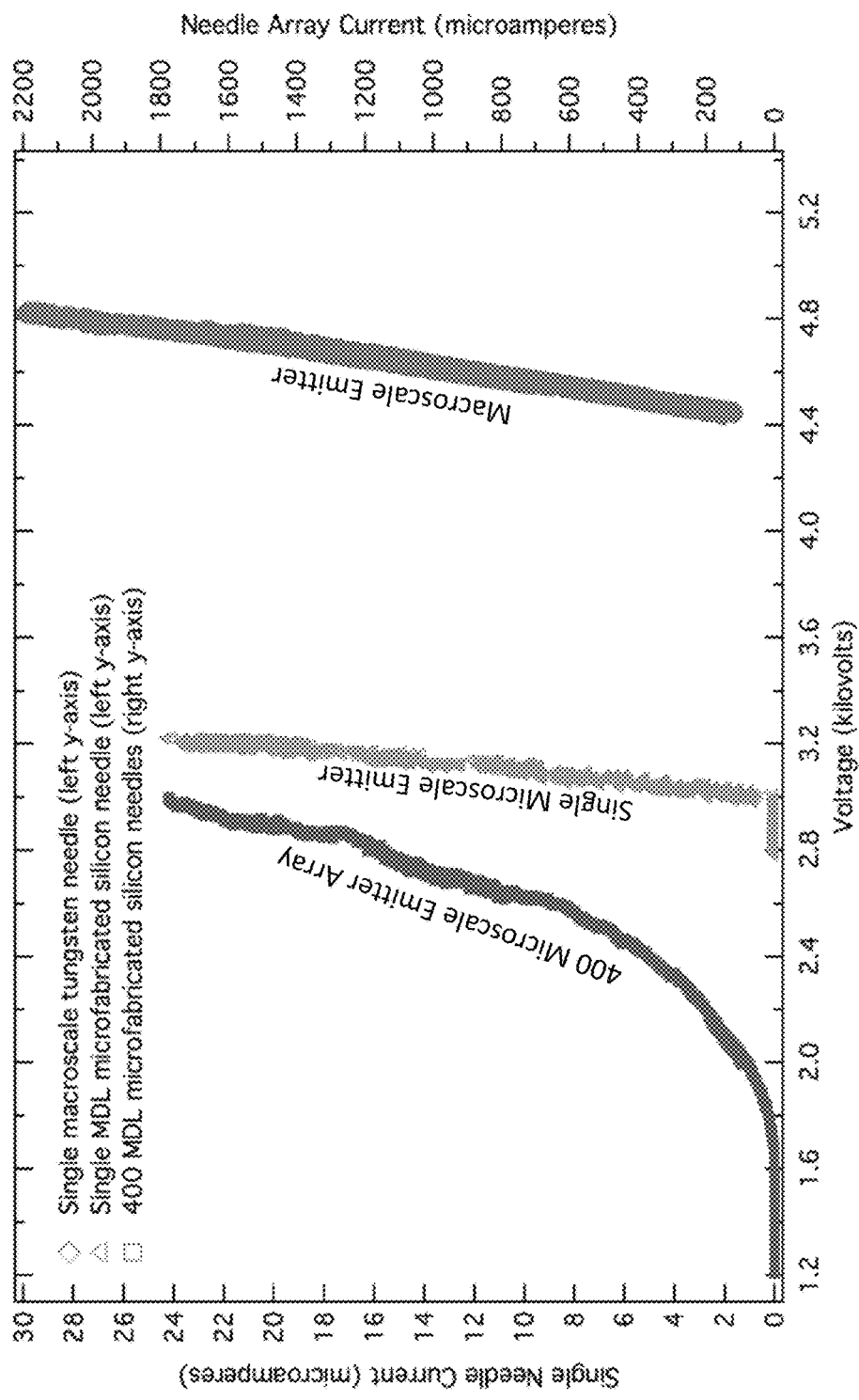
FIG. 1 provides a data graph comparing the current vs. applied voltage for a single microfabricated emitter and array of emitters and a single macroscale emitter.

The present disclosure may be understood by reference to the following detailed description, taken in conjunction with the drawings as described below. It is noted, for purposes of illustrative clarity, certain elements in various drawings may not be drawn to scale.

In accordance with the provided disclosure and drawings, micro-emitter arrays and methods of microfabricating such emitter arrays are provided. In many such embodiments the microfabricated emitter arrays incorporate a plurality of emitters arranged on a supporting substrate, each emitter comprising an elongated body extending from the top surface of the substrate and incorporating at least one emitter tip on the distal end of the elongated body thereof. In some such embodiments the emitters are disposed on the substrate in an ordered array in an X by Y grid pattern, wherein X and Y can be any number greater than zero. In many embodiments, the micro-emitter arrays utilize a propellant including, for example, gallium, indium, gold, bismuth, tin. In some such embodiments the substrate incorporates at least one through-via providing a fluid pathway for the LMIS propellant to flow from a propellant reservoir beneath the substrate to the top substrate surface whereupon the micro-emitter array is disposed.

In many embodiments the micro-emitters of the array are engineered such that at least the uniformity, shape, height, and/or surface texture of the emitters may be calibrated to within a specified tolerance range. In many such embodiments at least the variance in the shape and height of the emitters of the array are constrained with a micron-scale precision and uniformity. In many other embodiments, the emitters within the array are configured to extend to a substantially uniform height to ensure proper Taylor cone formation and uniform ion emission at the emitter tip apexes. In some embodiments the uniformity of height of the emitter may be ±10 microns. In several embodiments, at least one emitter may have a height from the substrate surface such that the electric field at the tip is at least one order of magnitude greater than the electric field at the substrate surface. In other embodiments, the cone half-angle of the tip portion of each of the at least one emitter is greater than the Taylor half-angle, i.e., the half-angle formed by a Taylor cone. In some embodiments, the tip half-angle of each of the emitters is at least greater than 49°. In some other embodiments, the at least one emitter may have one or more grooves that extend axially at least partially along the outer surface of the emitter. In some such embodiments the grooves may extend from the base of the emitter to the emitter tip. In many other embodiments, the at least one emitter may have a sidewall having an interior angle with relation to the substrate surface of between about 65°-90°. In still other embodiments, the surface of at least one emitter is free of growths extending from the outer surface thereof.

For the purposes of this disclosure, uniformity shall be taken in many embodiments to mean at least a majority of the emitters meet the criteria in question, in other embodiments that at least 80% of the emitters meet the criteria, in still other embodiments that at least 90% of the emitters meet the criteria, and in yet other embodiments that all the emitters meet the criteria.

Many other embodiments are directed to methods of forming microfabricated emitters and micro-emitter arrays on a substrate for use in microfluidic electrospray thrusters. Many such embodiments utilize a combination of lithography and etching. In some such embodiments, a lithography procedure designs the feature specifications necessary to create a micro-emitter array with characteristic emitter uniformity and height. In other such embodiments, an etching procedure fabricates the feature specifications. In several embodiments, chemical functional-group layers are coated onto the substrate for downstream feature formation. In some such embodiments, the functional-group layers can be an oxide or nitride or polymer resist. Even more embodiments are directed at through-via formation. In addition, still other embodiments are directed at emitter formation. In more such embodiments, array and emitter designs are patterned onto the substrate by grey-scale e-beam or photo lithography. In several other embodiments, array and emitter features are formed with deep reactive-ion etching. In many more embodiments, a metallization procedure is used to coat and wet the substrate, preparing the substrate for use in a microfluidic system.

In many embodiments, the micro-emitter arrays are employed in microfluidic electrospray thrusters. In such embodiments, the micro-emitter arrays may be incorporated with suitable propellant reservoirs, extractor grids, voltage sources and control electronics. Exemplary embodiments of such structures may be found, for example, in U.S. Pat. No. 8,850,792 B2 (application Ser. No. 12/975,124), the disclosure of which is incorporated herein by reference.

Embodiments of microfluidic electrospray thrusters typically consist of a reservoir to store a propellant material, a heater to reduce the viscosity of the propellant, an emitter array to channel the propellant, and an extractor electrode to generate an electric field to extract charged propellant particles and accelerate them to produce thrust. In some embodiments, the top surface of the micro-emitter array can be wetted with a liquid metal ion source (LMIS) such as indium. In such systems capillary forces can be used to feed the electrospray system such that the liquid metal travels up the emitters from the top surface of the base. When voltage is applied between the emitter and an extractor, the liquid propellant can form a Taylor cone and jet at the tip apex of the emitters such that liquid-metal ions are emitted from the apex. The electric field of the extractor grid then accelerates the ions away from the thruster to create thrust.

Microfabricated electrospray thrusters offer several advantages over conventional thrusters. Conventional electrospray thrusters are large, heavy, and limited in thrust range. For example, a typical macrofabricated thruster emitter array having a 4×4 array of emitter elements consumes a 4×4 cm footprint of space, has a propulsion system mass on the order of kilograms, and can deliver approximately 1 to 4 microNewtons (mN) from a single thruster tip. On the other hand, microfabricated emitters having a 4×4 array of emitter tips can fit in a 2×2 mm space, have a mass less than a gram, and may deliver about 0.5 µN from a single emitter tip. Accordingly, microfabricated electrospray thrusters have relatively small weight and volume requirements compared to macroscale thrusters. Moreover, although microfabricated emitter thrusters may produce less thrust per emitter body or element, as shown in FIG. 1, an array of such micro-emitter bodies or elements provide greater thrust density than do macro-thrusters at similar or lower extraction voltages. Lower voltage requirements further reduce the volume associated with the thruster and power system. However, in order to generate sufficient levels of thrust with such microfluidic electrospray thrusters there is a need to incorporate many hundreds of individual emitter tips. These microfabricated arrays are scalable to thousands of emitters in an array to operate at millinewtons of thrust.

The microfabricated emitter array is the heart of the microfluidic electrospray thruster and the most challenging component to design, fabricate and test. Although functional microfluidic electrospray thrusters incorporating arrays of emitters have been previously constructed, the performance of these thrusters has not been able to match theoretical benchmarks. In order to be functional for satellite propulsion, micro-emitter arrays need to provide over 100 µN of thrust. Other performance requirements are provided in Table 1, below. However, forming arrays of micro-emitter bodies or elements capable of meeting these performance requirements has not been possible.

TABLE 1

| Parameter | Emitter Array | Single Emitter |
| --- | --- | --- |
| Thrust (µN) | 10-210 | 0.03-0.67 |
| Current (µA) | 3240 | 0.5-10 |
| In flow rate (mg/s) | $4.8 \times 10^{-3}$ | $15 \times 10^{-6}$ |
| Number of emitters | 400 | 1 |
| % on at nominal current | 80 (320 emitters) | 1 |
| Operating voltage (kV) | <4 | <4 |

It has now been found that traditional chemical etching and photolithography techniques are not capable of producing micro-emitter arrays with the characteristics (e.g., uniformity, shape, height, and surface texture) necessary for use in such microfluidic electrospray systems. For example, analysis now shows that previous techniques were not able to form emitters of sufficient height uniformity and with controllable enough geometry. It has been discovered that variability in the height of individual emitter within an array prevents the ability of the combined emitters within the array to operate uniformly enough to control the current range in an array to achieve both the required thrust level and lifetime. Another complication seen with previous emitter arrays and manufacturing techniques is that the emitter tip cone half-angle is too sharp leading to a failure of the LMIS propellant to form a Taylor cone on the apex of the emitter to achieve the required beam divergence for efficiency and lifetime. Previous techniques were also incapable of forming optimally shaped axial grooves. Conventional techniques also have the tendency to produce emitters having flaws (such as, grass or extraneous projections or extensions on the outer surface thereof). It has been determined that such flaws can significantly hinder the capillary forces that serve to draw the propellant up to the emissive apex of the emitter, or could serve as secondary uncontrolled emissive points. Additionally, conventional techniques have been found to undercut the emitter side-wall, creating a base-to-side-wall angle greater than 90°. Such undercutting can be problematic because thicker films of the propellant and the wetting layer are required to wet the surface of the emitter array with a continuous film, leading to greater manufacturing inefficiencies.

Figure 2A:
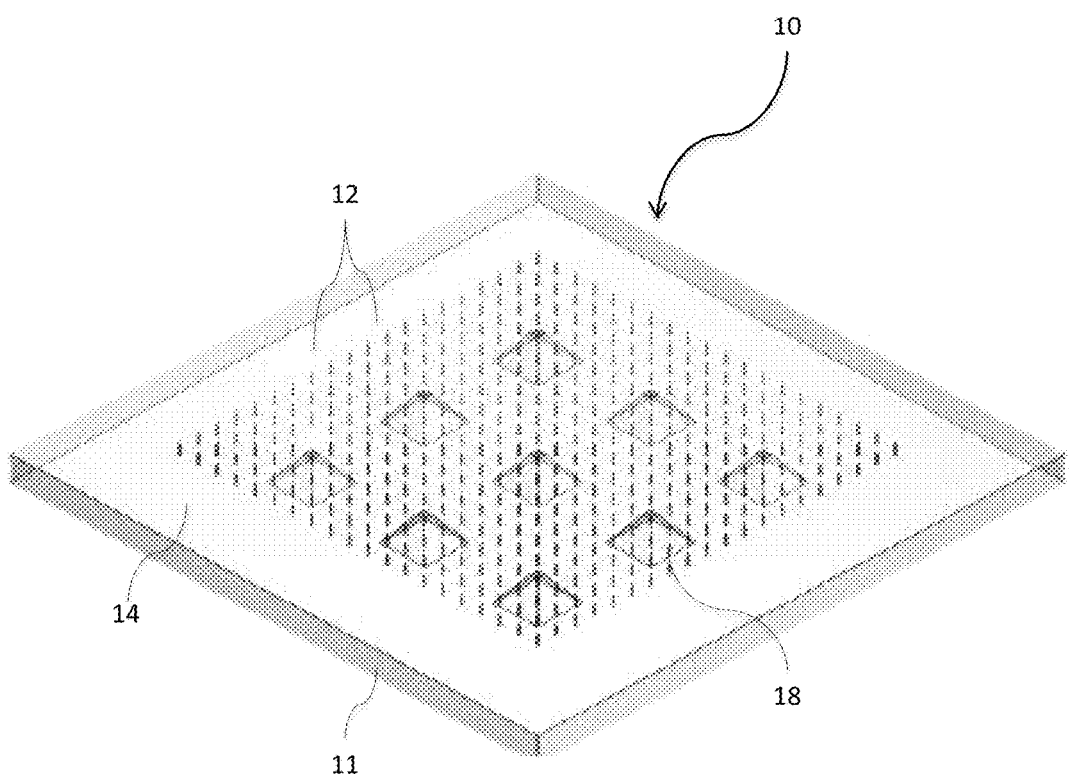
FIG. 2A provides a schematic perspective view of a micro-emitter array in accordance with embodiments of the invention.

Embodiments of emitter bodies and emitter arrays having characteristic configurations and uniformities capable of meeting performance criteria are now provided. In many embodiments, microfabricated emitters and micro-emitter arrays for use in microfluidic electrospray thrusters are provided. A micro-emitter array (10) in accordance with many embodiments is shown in an overhead-view in FIG. 2A and a cross-sectional view in FIG. 2B. As shown, the micro-emitter array (10) in accordance with such embodiments comprises a porous substrate (11) having a plurality of emitters (12) disposed on the top surface (14) thereof. The micro-emitters (12) generally comprise an elongated body having a proximal end attached to the top substrate surface (14), and a distal end comprising the terminating tip (16) of the emitter. In addition to the array of micro-emitters, the thruster substrate (11) in accordance with embodiments may further comprise at least one fluid passage or through-via (18) extending from the bottom to the top of the substrate. Although the emitters and through-vias can be arranged in any suitable number or pattern on the substrate, in some embodiments, as shown in FIG. 2A, the emitters may extend upward from the substrate surface and may be arranged in a 20×20 array (e.g., straight-line, square, rectangle, etc.). In such embodiments, the propellant fluid passages or through-vias can be arranged in a 3×3 array etched into the base emitter array chip.

Figure 2B:
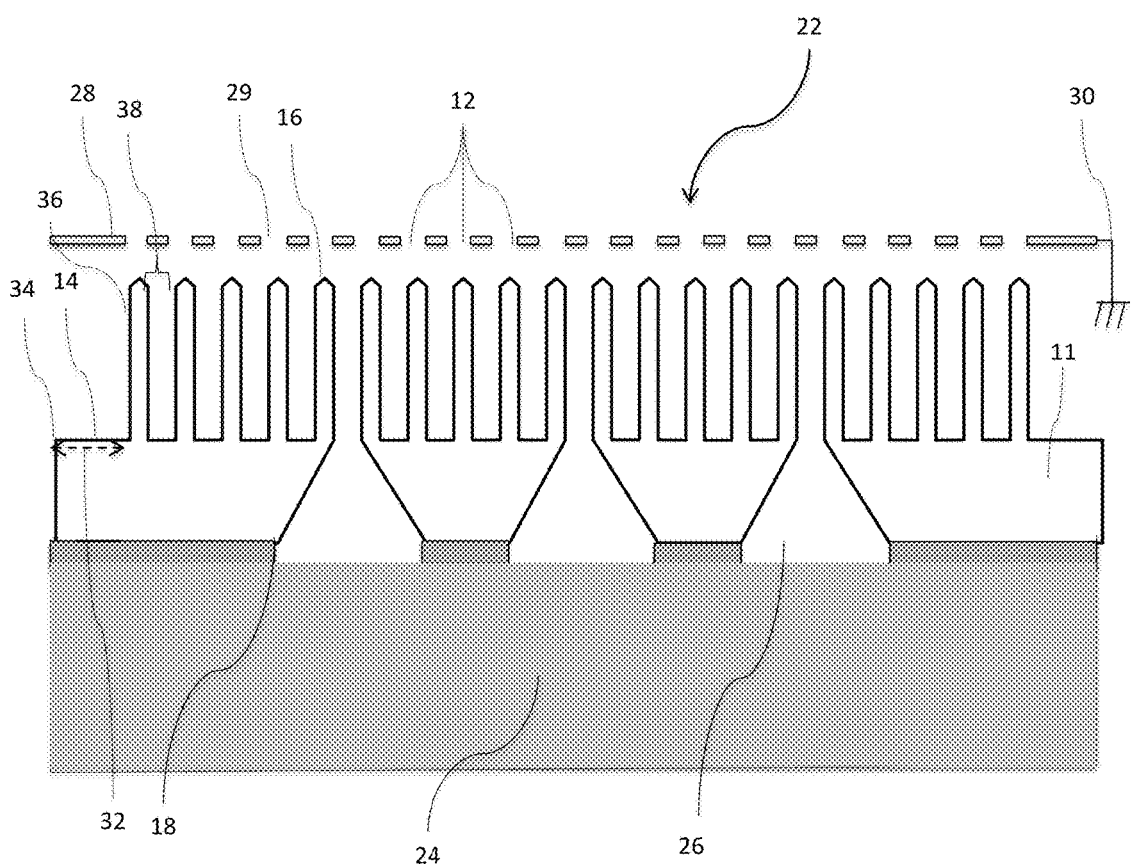
FIG. 2B provides a schematic of a cross-sectional view of a micro-emitter array in accordance with embodiments of the invention.

As further shown in FIG. 2B, in many embodiments the micro-emitter arrays may be incorporated into microfluidic thruster devices (22). Such thrusters may, in accordance with embodiments, consist of a propellant reservoir (24) in fluid connection with the substrate surface (14) through one or more fluid passage (e.g., through-vias) (18). In many embodiments one or more heat sources (26) may be disposed in thermal communication with one or both of the reservoir (24) and the substrate surface (14) to heat the solid propellant material such that it has a sufficiently low viscosity to flow through the thruster. Suitable viscosities for any LMIS propellant material will be known or obtainable by those skilled in the art. As shown in FIG. 2B, in some embodiments the heat source (26) may be disposed directly beneath and/or attached to the bottom surface of the emitter chip substrate (20), although other configurations and placements may be employed such that sufficient heat is provided to the reservoir and substrate to allow for the propellant to be maintained in a flowable state across the substrate and up the emitter bodies. An extractor grid (28) is disposed above the distal end (16) of the emitters such that the grid-pattern of the extractor grid and the emitter array are congruent (e.g., wherein the holes (29) within the extractor grid are located directly above the tips (16) of the emitters (12) in the array and the emitters are centered in the extractor apertures). The extractor grid (28) itself is connected to a voltage source (30) and/or controllers capable of applying a voltage to the grid sufficient to allow for the extraction of propellant ions from the emitter tip apexes of the emitter array.

During operation, in accordance with many embodiments, the heater (26) applies thermal energy to the propellant metal ion source to reduce the viscosity of the metal propellant material to form a liquid capable of flowing over the substrate surface (14) and up the plurality of emitters (12) of the array from the reservoir. A voltage is then applied from the voltage source (30) across the extractor grid (28) to create an electric field. The electric field attracts the LMIS, which travels from the substrate surface, up the emitters (12) to the emitter tips (16). In several embodiments, the electric field induces the LMIS to form a Taylor cone on the apex of the emitter tip (16). A liquid jet of LMIS that forms highly charged liquid particles are then ejected from the Taylor cones of the emitters (16) of the array through the extractor grid (28) and out of the thruster (22), thus generating thrust. As the propellant is consumed on the emitters (12) and the substrate surface (14), additional propellant flows up and through the fluid passages (18) onto the top surface (14) of the substrate.

Although the above description assumes that propellant is pulled exclusively from the propellant reservoir to the substrate surface and from there up the emitters of the emitter array, it should be understood that the substrate surface and the emitters of the array may be provided with a wetting layer (e.g., from a wetting material, such as, for example titanium or tungsten or other suitable material) to encourage or ensure the flow of the propellant along the emitters during operation. In some embodiments, an additional wetting layer of gold, or any other suitable material, may further be deposited atop the initial wetting layer to encourage flow of the propellant onto the wetting layer. In still other embodiments, the LMIS propellant may be deposited atop the wetting layer or layers. It will be understood by anyone skilled in the art, that the LMIS propellant can be any highly conducting fluid capable of forming a Taylor cone and jet to provide charged particle beams. For example, in many embodiments the LMIS propellant can be indium, gallium, gold, bismuth and other liquid metals.

In several embodiments, the distance (32) from the edge (34) of the substrate to the outer row (36) of the array of emitters is between 1 and 10 mm to allow integration with the thruster assembly (12). In many embodiments, the distance (38) between the individual emitters (12) is also sufficiently large to allow the propellant between each emitter and through vias between emitters and to allow the required extractor aperture diameter and spacing consistent with the emitter spacing. In many such embodiments the spacing (38) is from 400 to 1000 microns. On the bottom of the substrate, the through vias (18) are fabricated to permit flow of the LMIS propellant from the propellant reservoir (24) onto the top surface (14) of the base. The depicted embodiment shows the through-vias (18) with a depth extending from the bottom surface to the top surface of the substrate. In some such embodiments, substrate is around 500-700 microns thick, which ensures a sufficiently robust chip and sufficient thermal energy is transmitted to the substrate surface from the heating device to prevent solidification of the LMIS during operation. Although it will be understood that thicker substrates may be use in systems with heaters having greater thermal energy capacity or requiring greater structural integrity.

Figure 3:
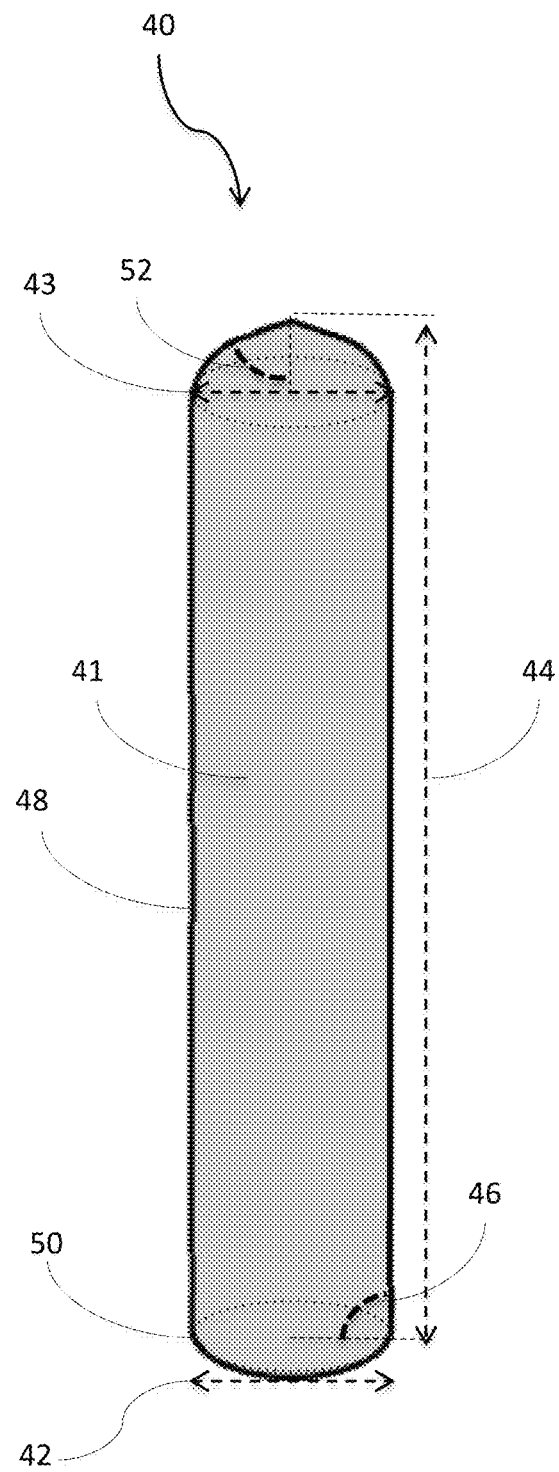
FIG. 3 provides a schematic of an emitter in accordance with embodiments of the invention.

Turning now to the construction of the emitters, in many embodiments, emitters are provided having suitable conformational characteristics (e.g., uniformity, shape, height, and surface texture) such that stable Taylor cone and emissive jet formation may be achieved on the apexes of all of the emitters of the array under a uniform excitation voltage. An embodiment of an emitter (40) is shown schematically in FIG. 3. In the depicted embodiment, the emitter generally comprises an elongated body (41) composed of a porous material, such as silicon or an oxide thereof. As shown in FIG. 3, the emitter shape may be characterized by several physical parameters (e.g., height, cross-sectional area, the angle of the outer wall to the substrate and the tip half-angle). In many embodiments, emitters may take a base diameter (42) in the range of 100 to 250 microns, a shaft diameter (43) of 30-180 microns and in some embodiments up to 250 microns, and a height (44) greater than 200 microns, and in some embodiments greater than 300 microns. The interior angle (46) of the emitter sidewall (48) and the surface of the base (50), in accordance with embodiments, can range between 60° and 95°. Likewise, in accordance with other embodiments, the cone tip at the top of the emitter should have an interior half-angle (52) of around 55°±6°, and in some embodiments a radius of less than around 2 microns. In many embodiments, the emitter surface should also be free of imperfections (e.g., discontinuities, or elongated projections) along the outer walls and tip that could inhibit the capillary action of the LMIS on the emitter surface. Although emitters having a cylindrical cross-section are shown in many of the figures, it will be understood that any cross-section suitable for the production of an emission at the tip thereof may be used.

Figure 4A:
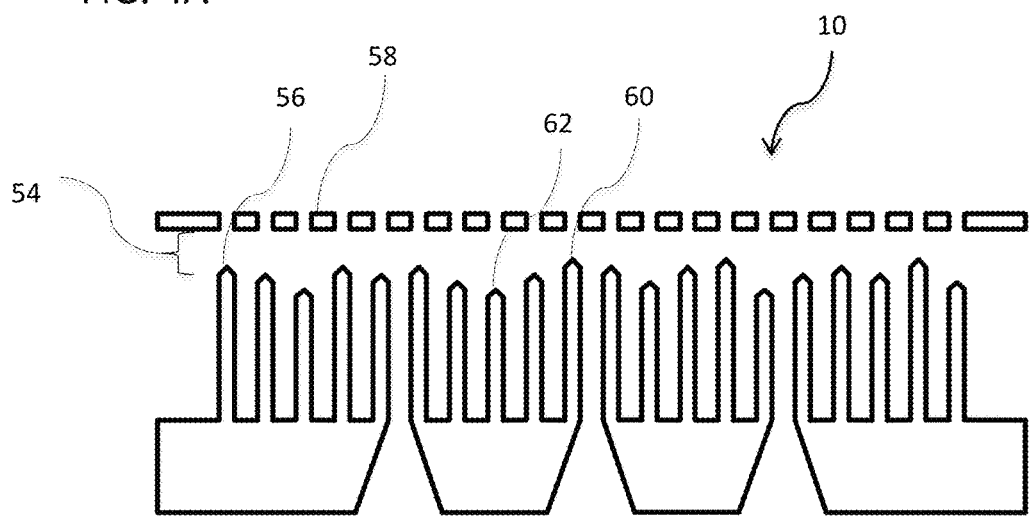
FIG. 4A provides a schematic cross-sectional view of a micro-emitter array with variable emitter heights.
Figure 4B:
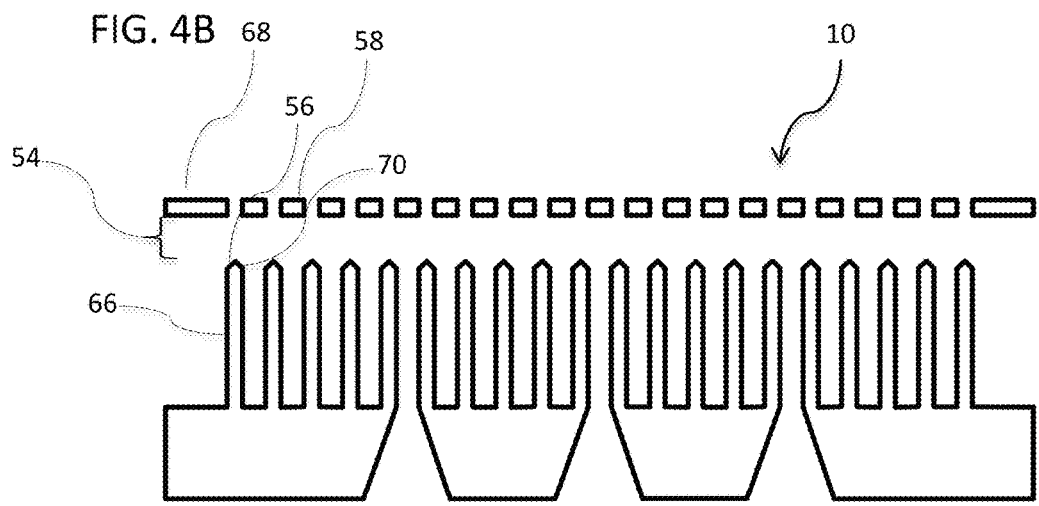
FIG. 4B provides a schematic of a micro-emitter array with uniform emitter heights in accordance with embodiments of the invention.
Figure 5:
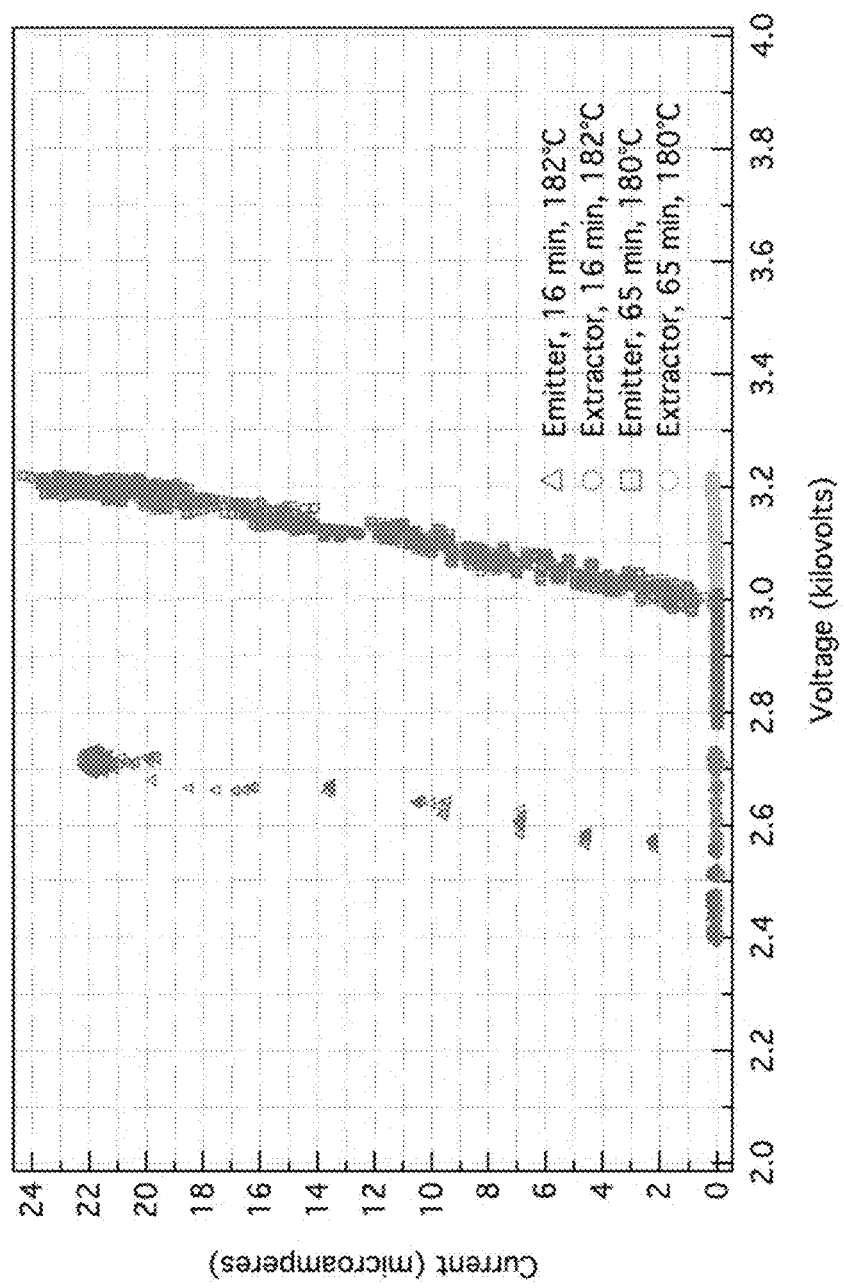
FIG. 5 provides a data graph plotting current vs. voltage over different time and temperature conditions for emitters in accordance with embodiments of the invention.

As shown in FIG. 4A, it has now been discovered that when the distance (54) between the array emitter tips (56) and the extractor (58) varies, the apparent turn-on voltage at the emitter tip (56) will also vary. This is because the tips (60) closest to the extractor experience the greatest force from the electric field generated by the voltage applied between the emitters and the extractor, the distance between them and the field enhancement of the emitter geometry, while emitter tips (62) further away from the extractor will experience less force. Suitable electrospray function requires that the LMIS experience an electric force within a predefined range such that an electrospray with the current within a limited range of less than 20 microamperes per emitter is generated at the emitter tips. For example, the data in FIG. 5 show that a microfabricated emitter current can increase from 0 µA to >20 µA within a very narrow voltage range <120 V near start-up and within <200 V after 65 minutes of operating. The single emitter current objective for the thruster is 10 µA. In addition, the data in FIG. 5 (taken extractor with an aperture diameter of 400 microns and a gap of about 50 microns) show that at emitter currents of less than 20 µA less than 1% of the current from a single emitter is intercepted by the extractor. In short, the emitters will be operating within a predefined range of that current depending on their turn on voltage, thus if the turn-on voltage range of all of the emitters in the array varies by more than 50 V some emitters will be emitting more than 20 µA while others are emitting at substantially less to achieve the total required current from the array. If emitters are being overdriven (i.e., producing higher emission currents) by the emissive voltage the conformation of the emission can be effected resulting in the emission of droplets in a broad arc that could hit and sputter the extractor and contaminate the emitters, reducing the operating efficiency and lifetime of the thruster.

By contrast, when emitter tips (56) experience the proper force, the propellant flowing up the emitter sidewall (66) forms a Taylor cone on the emitter tip apex (56), and emits the propellant as a narrow charged particle jet that exits through the apertures (68) of the extractor grid (58), thus creating the appropriate thrust level. By contrast, and as discussed above, emitter tips (60) that experience excessive electric fields will emit excessive currents and droplets that can sputter the extractor grid (58), and then contaminate the emitters with extractor material and cause droplet emission. Likewise, excessively strong forces can cause formation of Taylor cones on the corners (70) of the emitter where the cone tip (56) and sidewall (66) adjoin or on the shaft. Jet formation on the corners (70) of the emitter can also cause the LMIS to spray into the extractor to decrease lifetime (58) and increase beam divergence to reduce efficiency. Regardless of the mechanism, the intercepted current can cause sputtering damage and reduce the thruster lifespan and operating efficiency. Alternatively, experiencing a weak electric force may prevent Taylor cone and jet formation. Thus, emitter tips (62) that are too far from the extractor are not able to produce any thrust. In addition, weak electric forces may allow the LMIS to drip off the cone tip (56) and back down the side (66) of the emitter, causing the uneven dispersal of the propellant coating on the substrate surface. Uneven coating of propellant can disrupt the function of nearby emitters. In addition, smaller and uniform gap space between emitter tips and the extractor, in accordance with embodiments, can further improve the turn-on voltage range for the array, increasing uniformity of electric field experienced at the emitter tips. Accordingly, in many embodiments the emitters are configured to have a height variance that allows for the operation of a majority of the emitters at an emitter current below this 20 µA. In other embodiments 80-100% of the emitters operate to provide an emission current below this 20 µA threshold. In some embodiments, the emission currents are controlled by having a height variance that allows for a majority of the emitters to turn on at a voltage that varies over a range of around 100 V, and in some embodiments the turn-on voltage vary over a range of around 50 V. In other embodiments the height variance of the emitters is controlled such that at least 80% of the emitters have a turn-on voltage that varies over a range of around 100 V, while in other embodiments the turn-on voltages vary over a range of around 50 V. In still other embodiments the height variance of the emitters is controlled such that at least 90% and in some cases all of the emitters have the requisite turn-on voltage.

Figure 6A:
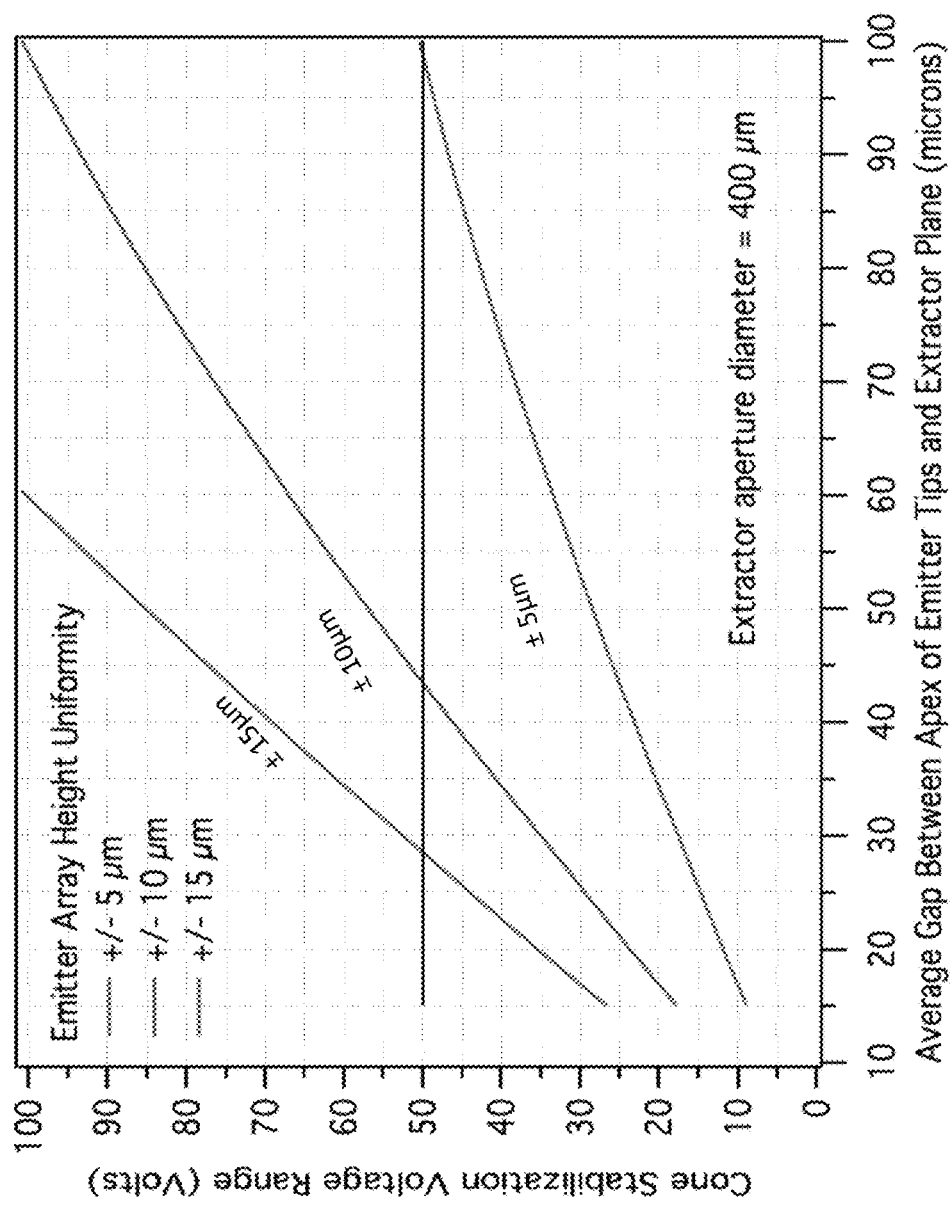
FIG. 6A provides a data graph showing cone stabilization range for emitter height variations in accordance with embodiments of the invention.
Figure 6B:
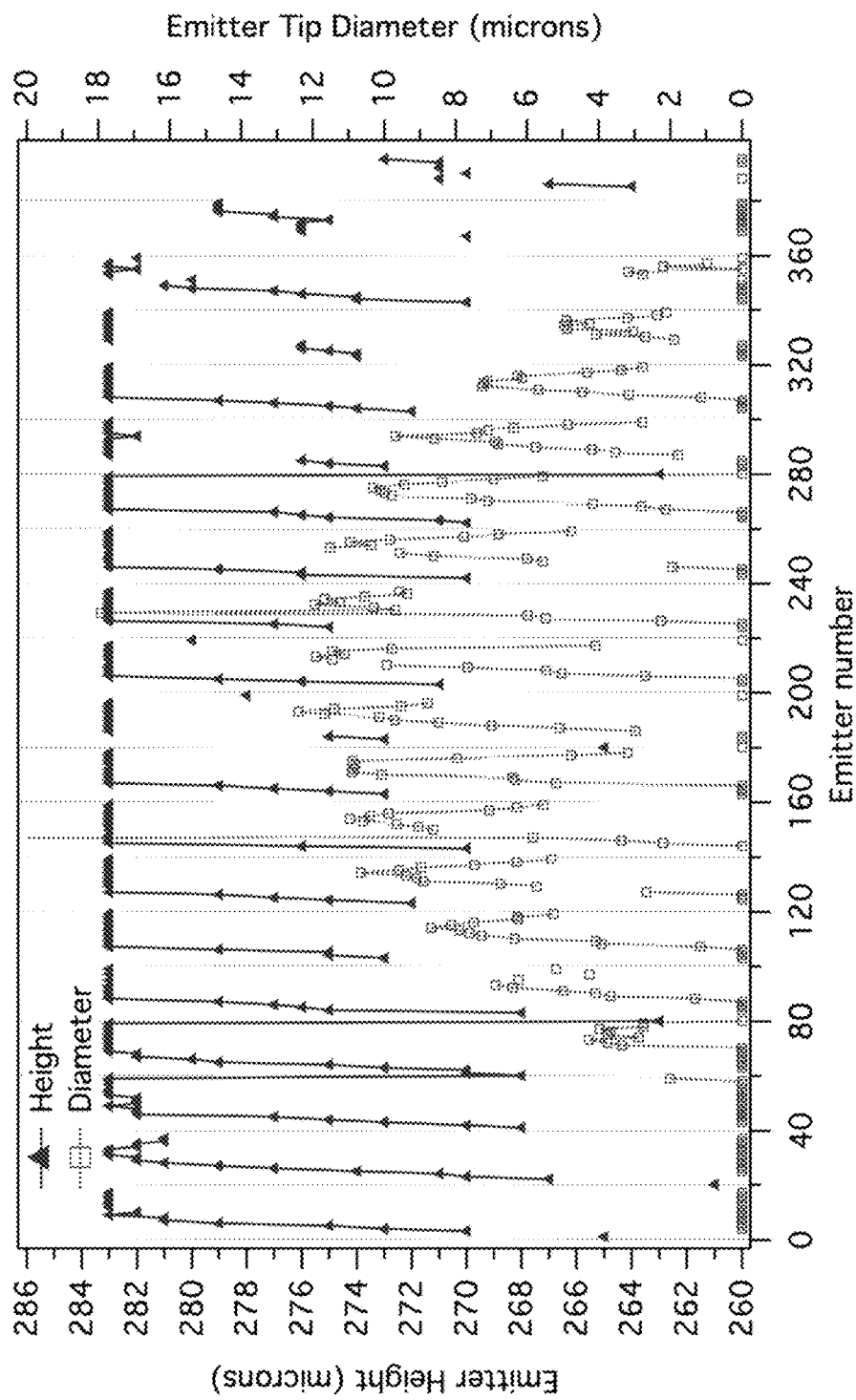
FIG. 6B provides a data graph showing emitter height and tip radius distribution for an emitter array in accordance with embodiments of the invention.

In many embodiments, an estimate turn-on voltage for an array may be estimated by the critical cone stabilization voltage. As understood by those skilled in the art, the critical cone stabilizing voltage for any material and emitter/extractor configuration can be roughly predicted by the equation: $1432 \cdot \gamma^{1/2} R_o^{1/2}$, wherein $R_o$ (cm) is the distance between the emitter and extractor aperture and $\gamma$ is the surface tension. An example of such a critical cone stabilizing voltage is provided in FIG. 6A, which shows the average extractor gaps and emitter height uniformity required to achieve turn on for all emitters in the array in less than 50 V for the case where the propellant is indium (surface tension 556 dynes/cm). At this cut-off voltage all of the emitters should be operating at less than 20 µA of current, which as described above is the current at which nearly all of the emission from the emitters exits the thruster and does not impact on the extractor to cause premature failure. Thus, an emitter height uniformity of +/−10 µm will require an average extractor gap of 40 microns for a turn-on voltage range less than 50 V (FIG. 6A). FIG. 6B provides a graph of emitter height fabrication for an exemplary emitter array. As shown, height uniformity of +/−10 microns has been microfabricated in an array of 400 emitters for 85% of the emitters. As discussed above, these smaller gaps and better uniformity will improve the turn-on voltage range for the array and current uniformity over conventional emitter arrays. Accordingly, in many embodiments, and as shown schematically in 4B, the distance (54) between each of the array emitter tips (56) and the extractor grid (58) should have sufficient uniformity such that the emitters emit at less than 20 µA. In many other such embodiments, the single emitter current objective is approximately 10 µA. In some embodiments, the gap (54) between the emitter tips (56) and the extractor grid (58) does not vary by more than ±10 microns, and in other embodiments they do not vary by more than ±5 microns. In other embodiments, the gap between the emitter tips and the extractor is approximately 40 microns for a turn-on voltage range less than 50 V. In many embodiments at least a majority of the emitters meet at least one of these criteria, in other embodiments at least 80% of the emitters meet these criteria, and in still other embodiments all the emitters meet these criteria.

Figure 7A:
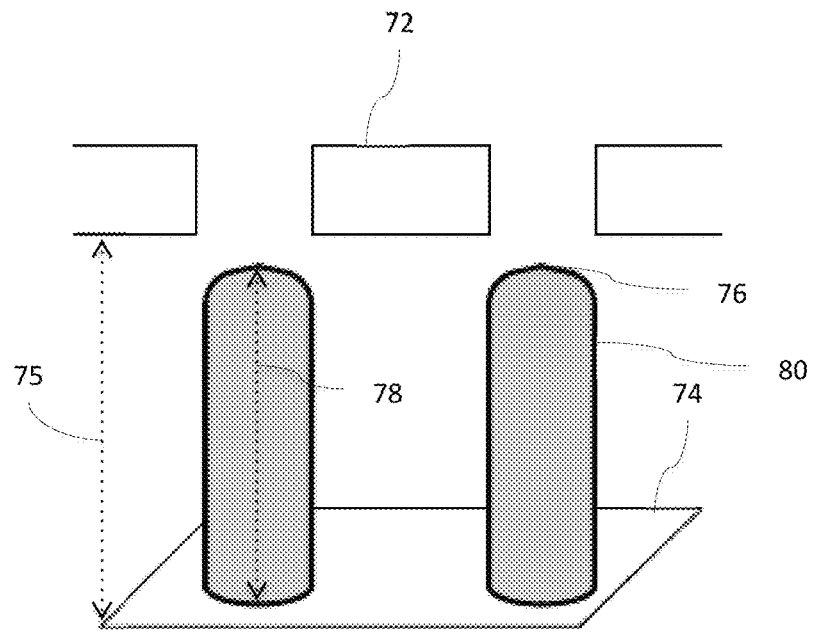
FIGS. 7A and 7B provide schematics of emitters with different heights relative to the substrate surface, in accordance with embodiments of the invention.
Figure 7B:
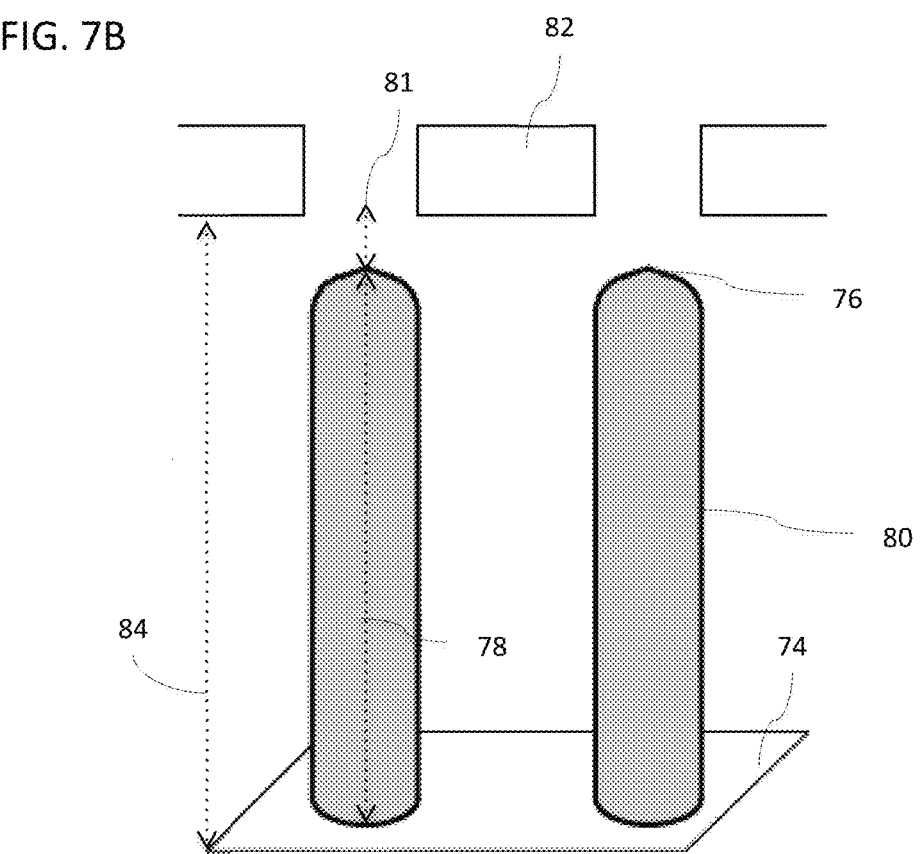
Figure 8:
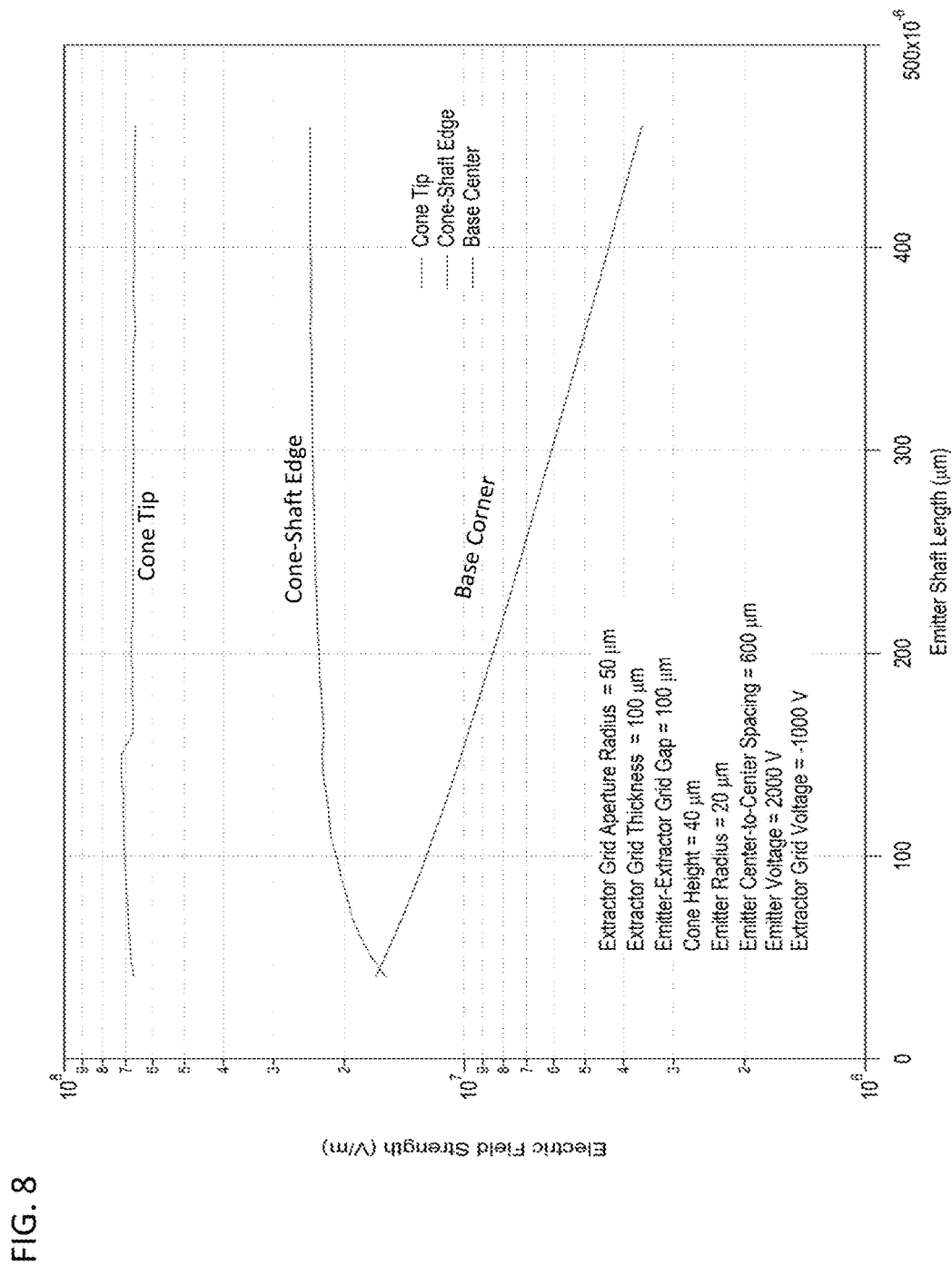
FIG. 8 provides a data graph showing electric field strength at emitter tip, cone shaft edge, and base at various emitter shaft lengths, in accordance with embodiments.

As previously discussed in brief, when the extractor grid (72) is positioned too near the substrate surface (74) (i.e., the distance 75 between the extractor and the substrate surface), as depicted in FIG. 7A, the propellant on the substrate surface may experience an electric force sufficiently strong enough to generate Taylor cone and jet formation from the substrate surface itself. Taylor cones formed on the substrate surface (74) can hinder proper Taylor cone formation on the emitter tip apexes (76) and further creates undesirable charged particle beams that can get intercepted by the extractor, thus leading to lower emission efficiency and mass loss. Accordingly, in many embodiments, the height (78) of the emitter (80) (i.e., the distance between the emitter tip (76) and the top surface of the substrate (74)) is great enough to ensure the electric force experienced at the emitter tip (76) is at least an order of magnitude greater than the force experienced at the substrate surface (74). In an experimental test with emitter and extractor grid voltage held constant and extractor grid gap (81) of 100 microns, it was found that emitter tips less than from somewhere between 200 and 300 microns in height, and in some cases around 280 microns in height experience an electric field within one order of magnitude (as shown in FIG. 8). Thus, although different heights may be used, in accordance with several embodiments, the emitter height (78) is greater than at least 200 microns, in other embodiments at least 280 microns. In accordance with other the embodiments, as shown in FIG. 7B, the distance (81) between the emitter tip (76) and the extractor (82) can be between approximately 40 and 100 microns. Therefore, in some other embodiments, the distance (84) between the extractor (82) and the base surface (74) should be greater than 300 microns, in other embodiments from 320 to 380 microns.

Figure 10A:
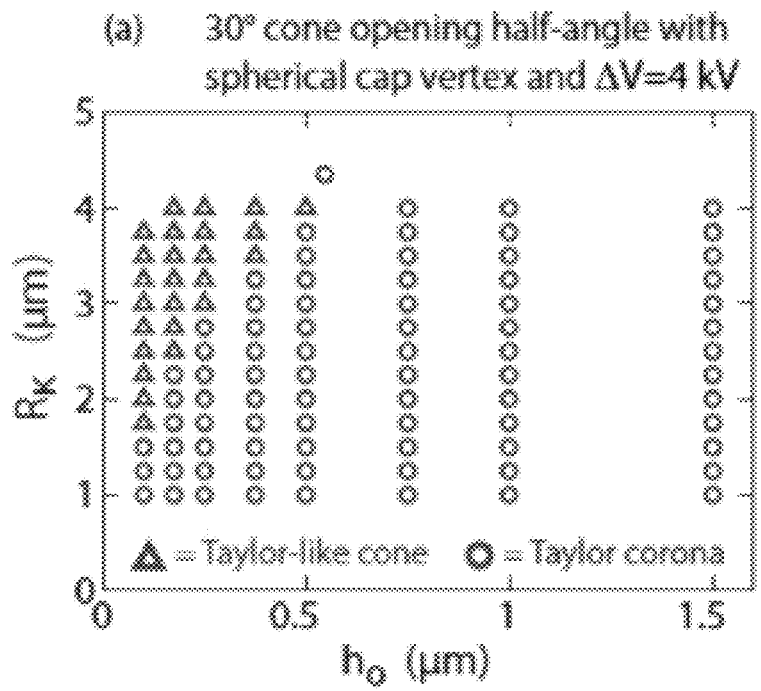
FIGS. 10a and 10b provide data graphs showing the relationship between cone tip angle and cone tip radius, in accordance with embodiments.
Figure 10B:
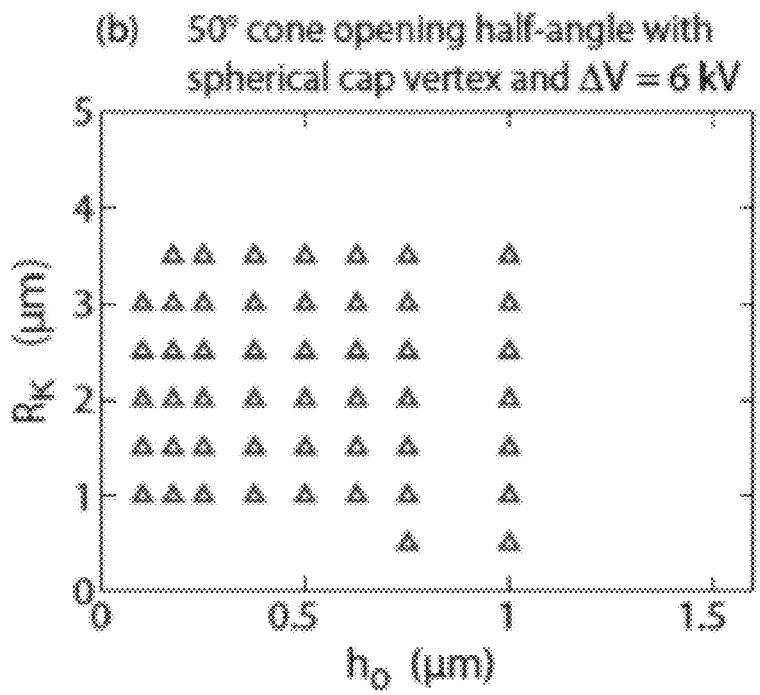
Figure 11:
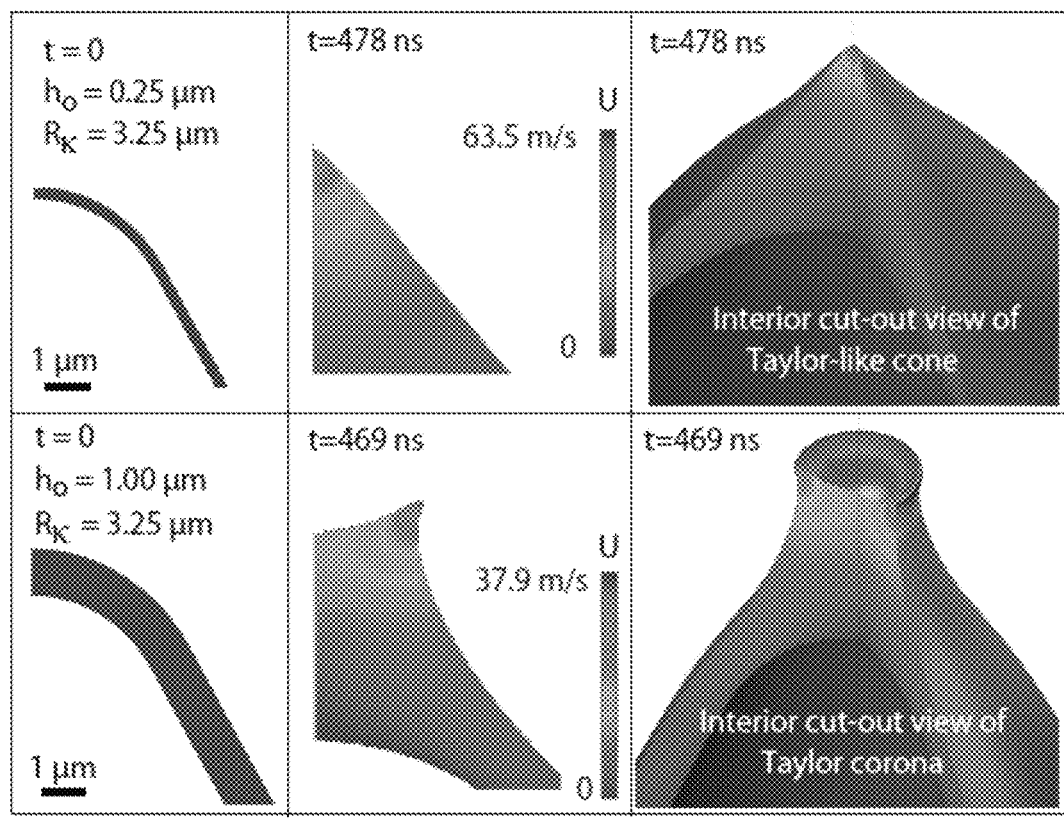
FIG. 11 provides illustrative data images depicting Taylor cones and Taylor coronas in relationship to tip radius.

As is known to those skilled in the art a Taylor half-angle is precisely 49.3°. It has been discovered that an emitter tip cone half-angle (86) and radius (87) (as shown in FIGS. 9A to 9C) are important to uniform Taylor cone formation control on conventional emitter tips. (See, e.g., A. E. Bell and L. W. Swanson, Appl. Phys. A 41, 335-346 (1986); A. E. Bell, the disclosure of which is incorporated herein by reference.) Likewise, the data in FIGS. 10A and 10B show that Taylor cone formation on micro-emitter tips relies upon the relationship cone half-angle and tip radius. The images in FIG. 11 show the modeling results demonstrating that off axis corona formation is possible under some emitter tip geometries and indium film thickness instead of a single Taylor cone formation on the apex of the emitter. In short, LMIS will struggle to form a single Taylor cone on the apex of tip half-angles (86) that are less than the Taylor half-angle (as shown in FIG. 9B). In addition, cone half-angles less than 49° will not pin the molten propellant on top the emitter without voltage applied. Instead, the propellant will drip off the cone tip (88) and back down the shaft of the emitter (90), causing an uneven and lumpy dispersal of propellant that disrupts the function of the emitters and can create large disparities of sensitivity to turn-on voltage. Furthermore, cone half-angles (86) less than the Taylor half-angle can facilitate Taylor cone and jet formation on the edges of the proximal end (92) of the emitter where the cone tip (88) and sidewall (90) adjoin. In regards to cone tip radius, uniformity can also impact the turn-on voltage sensitivities. Tips with larger tip radii will be less stable, which, in turn could cause the tips to emit droplets instead of forming stable Taylor cones. However, smaller radii and sharper tips (i.e., half-angles between 49° and 60°) can stabilize Taylor cones that are less likely to emit droplets at higher currents, mitigating sensitivity to geometric variations. Accordingly, embodiments are also directed to emitters having tip cone half-angles (86) capable of ensuring Taylor cone formation. In several embodiments, the emitter tip cone half-angle (86) is greater than the Taylor half-angle. In other embodiments, depicted in FIG. 9A, the cone half-angle (86) can be equal to or greater than 49°. In several embodiments, the emitter tip half-angle is less than or equal to 60°. In several more embodiments (as shown in FIG. 9C), the tip can form a flat surface (94). In even more embodiments, tips with flat surface (94) have a tip radius of 1 to 2 microns, and in some embodiments from 1 to 5 microns. In even other embodiments, flat-surface tips within an array have a radius that varies less than 1 micron.

Figure 12A:
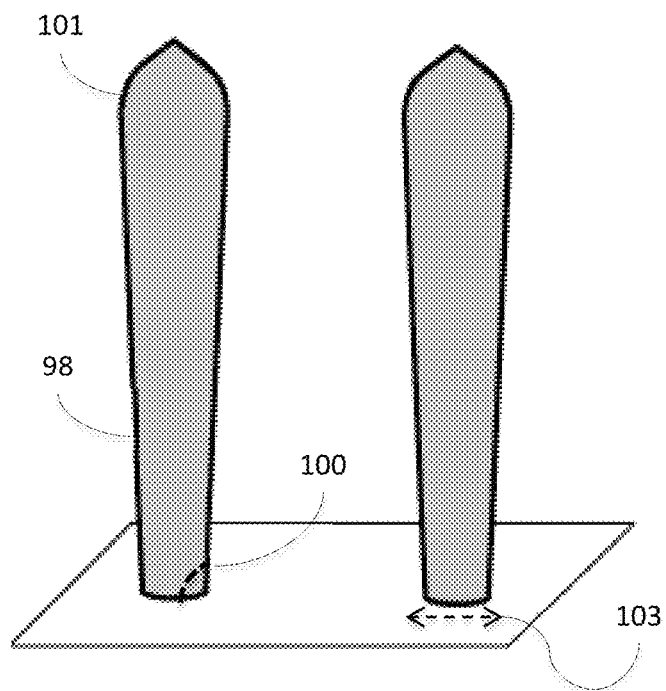
FIG. 12A provides a schematic of an emitter with a sidewall angle less than 90° and short base diameter.
Figure 13A:
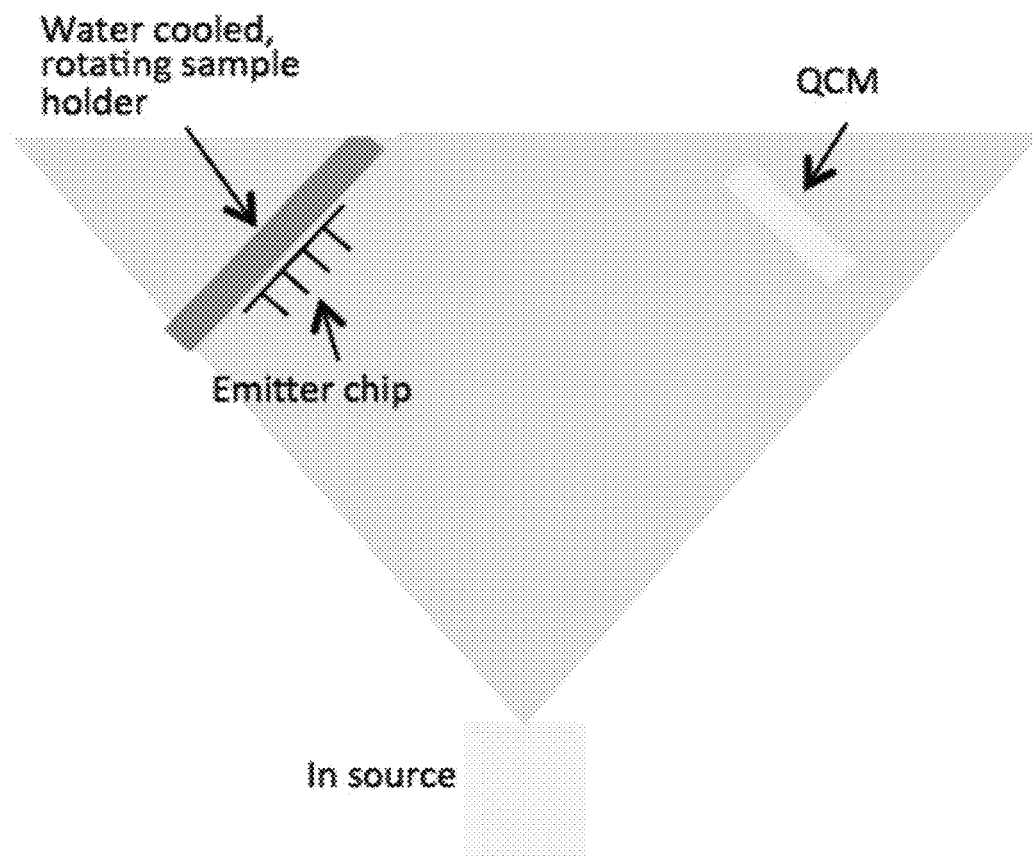
FIG. 13A provides a schematic of propellant loading onto the emitter array in accordance with embodiments of the invention.
Figures 13B, 13C:
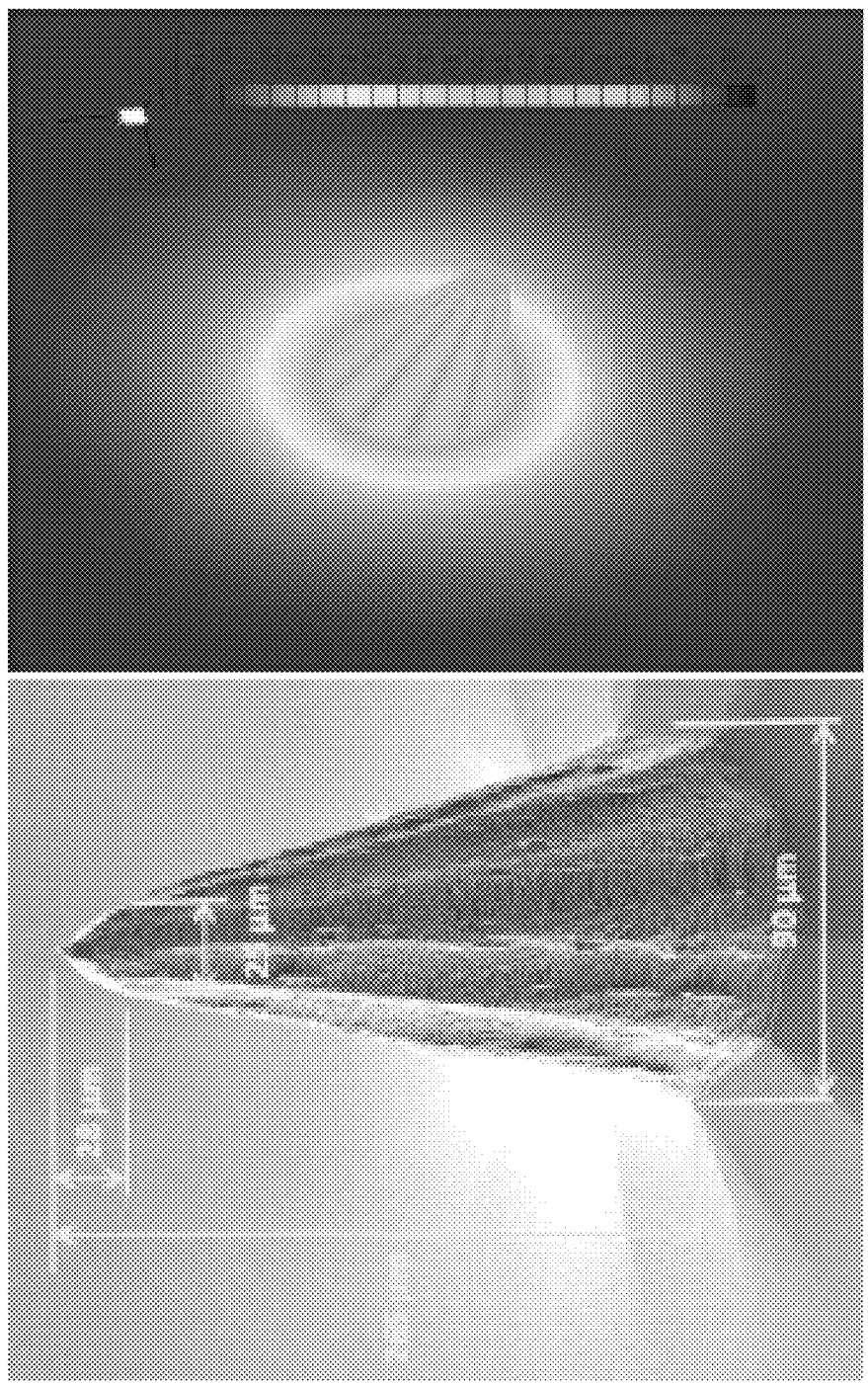
FIG. 13B provides a SEM image of an emitter used for modeling propellant loading in accordance with embodiments of the invention.
FIG. 13C provides an illustrative data image depicting the results of modeling of emitter propellant loading in accordance with embodiments of the invention.

Conventional etching techniques tend to undercut the emitter sidewall (98), creating sidewall angles (100) greater than 90°, as shown schematically in FIG. 12A When the sidewall angle (100) is greater than 90°, the propellant has difficulty traveling up along the sidewall to reach the emitter tip. In addition, sidewall angles (100) greater 90° have decreased diameter at the emitter base (103), requiring more preloading of the propellant and wetting layer to achieve a continuous film on the emitter array chip, reducing efficiency of the loading process. On the other hand, side angles less than 90° have increased diameter at the base (105), decreasing propellant and wetting film preloading thicknesses to achieve a continuous film. For example, FIG. 13 provides data of modeling of LMIS preloading rates of an emitter. FIG. 13A shows the configuration of the loading facility with the emitter chip, QCM and thermal evaporation source of indium. A scanning electron microscope (SEM) image of the emitter used for modeling is shown in FIG. 13B. The emitter has a height of 265 microns, a tip cone half angle of 33°, and a shank sidewall angle of 82°. The grooves are about 3 microns deep with a 120° open angle. The modeling results in FIG. 13C suggest a deposition rate on the emitter sidewalls that is 0.28× the chip base rate (between the emitters), and is 0.21× the base rate at the groove base. At these rates, the emitter will require deposition of 14 microns of indium to get 3 microns in the grooves at the base of the emitter where the deposition rate is the slowest. The outer sidewall of this emitter will require deposition of only 10.7 microns, as indicated by the QCM, to deposit 3 microns on the outer sidewalls. Reducing the shank sidewall angle further will increase the deposition rate on it and reduce the amount of indium to deposit to achieve a continuous 3 micron thick indium film on the emitters across the emitter array chip. Deposition of 3 microns of indium is required for a continuous film of indium, because of the lumpy surface morphology of it.

Figure 12B:
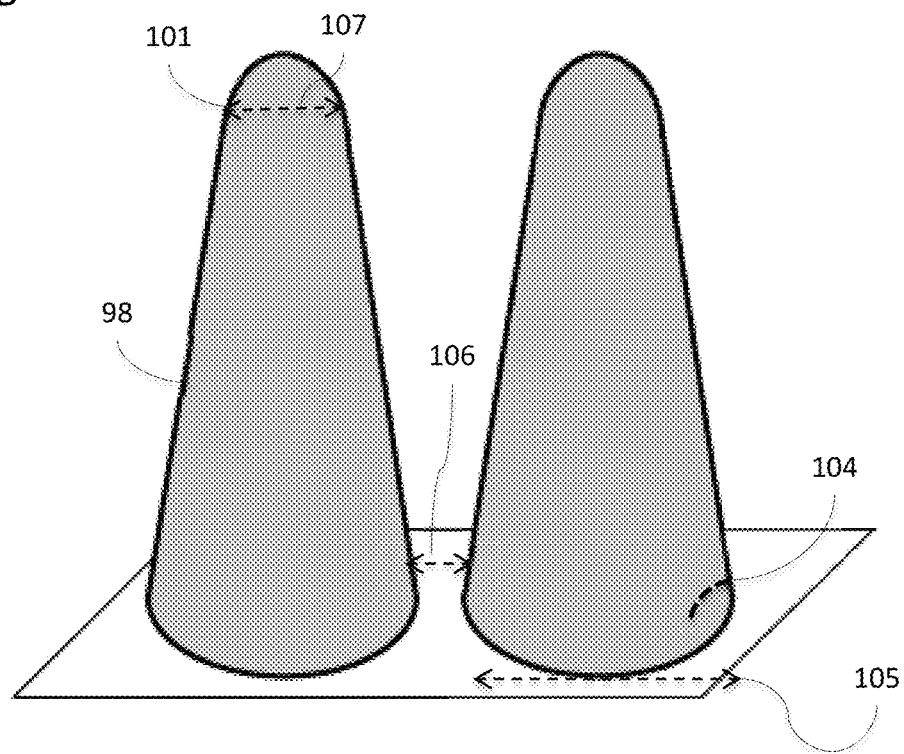
FIG. 12B provides a schematic of a tapered emitter with a sidewall angle greater than 90° and large base diameter in accordance with embodiments of the invention.
Figure 12C:
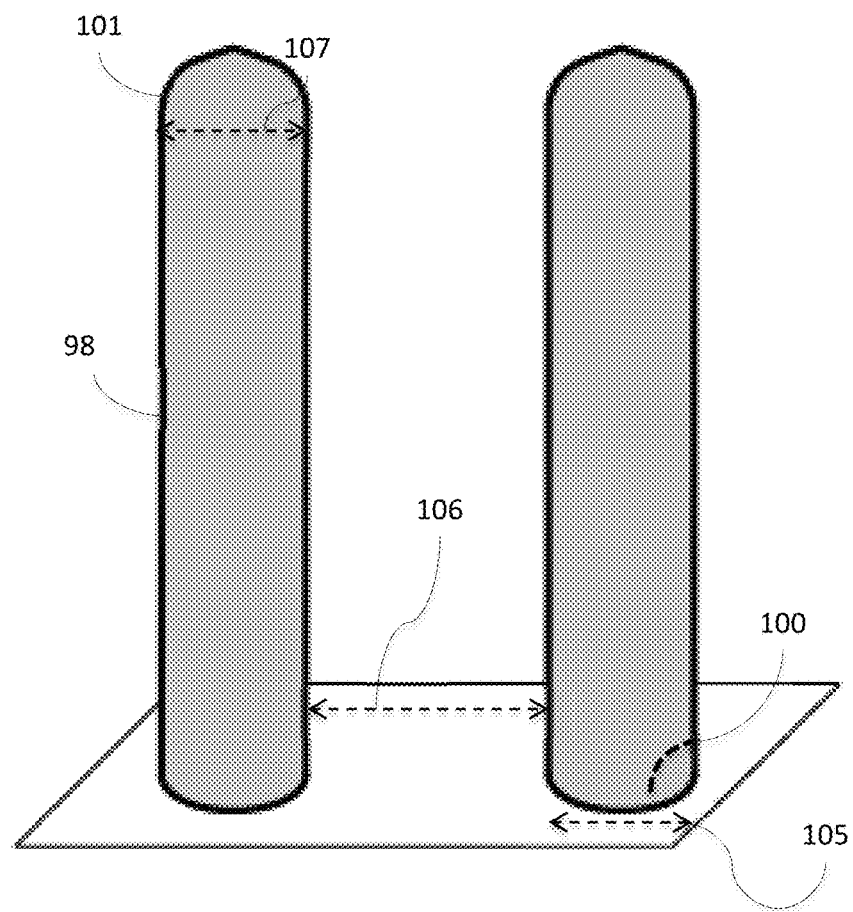
FIG. 12C provides a schematic of a straight-wall emitter with a sidewall angle near 90° in accordance with embodiments of the invention.

In addition, decreased side angles reduce the electric field experience at the sidewall-tip corner (101), mitigating the risk of improper emission cone formation there. However, in many embodiments it is desired to maintain a 500 micron emitter pitch such that the side-wall angle should be held to an angle of no less than 65°. Accordingly, in many embodiments, as shown in FIGS. 12B and 12C, the emitter sidewall (98) form a 65° to 90° angle (100 & 104) with the top surface of the substrate. The profile of the sidewall will depend on the array spacing and etching technique. In some embodiments, the emitter sidewall angle will be greater than 65° (104) to provide an emitter packing density as high as possible while ensuring that the spacing (106) between two emitters is between at least 200 and 500 µm. In other embodiments, the emitter sidewall angle may be equal to 90° (100). In even more embodiments, the emitter sidewall angle can be less than 90°, increasing the diameter at the base of tip. In some more embodiments, the emitter base diameter is between 100 and 250 microns.

The emitter array shaft diameter (107) is important to support axial grooves and to achieve the required operating voltages. Emitter array testing results revealed that microfabricated emitters with a 180 micron shaft diameter, a height of 400 microns, and an extractor gap of 100 microns required over 4 kV to emit only ~100 µA of current despite being very well loaded with indium propellant. Likewise, published data show that the threshold voltage significantly increases with shaft diameter in conventional thrusters. (See, e.g., A. E. Bell and L. W. Swanson, Appl. Phys. A 41, 335-346 (1986); A. E. Bell, the disclosure of which is incorporated herein by reference.) Because thruster emitter array operation at 3240 µA for 200 µN is required at <4 kV, emitters with smaller shaft diameters are necessary to keep the voltage to <4 kV. Thus, many embodiments are directed to shaft diameters between 30 and 50 microns for tapered emitters (i.e. side wall angle (104) less than 90°) and between 100 and 150 microns for straight-walled emitters (i.e., side wall angle (100) equal to 90°) to ensure an operating voltage less than 4 kV and still be able to support axial grooves. Accordingly, several embodiments are directed at emitters with shaft diameters large enough to support axial grooves. In more embodiments, emitter shaft diameters are small enough to keep operating voltage low enough for emitter array operation. In other embodiments, the shaft diameter of tapered emitters is between 30 and 50 microns. In still other embodiments, the shaft diameter of straight-walled emitters is between 100 and 150 microns.

The performance of electrospray emitters can be tuned by controlling the spreading propellant film thickness which coats the emitters. In short, controlling the flow and coating of emitters allows one to tune thrust levels from micro- to milli-newtons. In many embodiments the flow rates can be controlled in emitter array configurations by providing a capillary feed system. In some embodiments, the capillary feed system for these arrays may consist of a plurality of features, such as roughening or longitudinal grooves disposed along the outer surfaces of the emitter elements. The integration of such capillary flow systems between the emitter base and the roughened surface on the tip of the emitters is expected to provide the additional flow control required for emission stability for hundreds of hours of operation from hundreds of emitters in the arrays. Accordingly, embodiments are also directed to the emitter surface structure and texture. As depicted in an embodiment in FIG. 14A, the emitter (108) can be smooth without surface flaws or have a surface roughness of ≤2 microns. It will be understood by those experienced in the art that flaws in the surface texture include any inadvertent surface structures (e.g., tendrils, etc.) that might hinder liquid flow along the sidewalls. In some embodiments these inadvertent structures are limited to structures having feature sizes of no greater than 2 microns. In several embodiments, as shown in FIGS. 14B to 14F, the emitter sidewall can be formed with axial grooves (110) to help the liquid flow up the emitter with capillary forces. In many embodiments axial grooves may be provided to encourage delivery of the propellant to the emitter tip (118) and maintain a continuous film of the propellant on the emitters with or without an applied voltage. In some embodiments, as shown in FIG. 14B, the emitter can comprise one solitary groove. In other embodiments, as shown in FIG. 14C, the emitter can be formulated with two or more grooves (112). In many embodiments, the axial groove can be shaped in a rounded U (112), as shown in FIGS. 14B and 14C. In many other embodiments, the axial groove can form an angled V shape (114), as shown in FIG. 14D. In several more embodiments, the axial groove will be formed from the base of the emitter to the edge where the emitter cone tip and sidewall adjoin (112). In several other embodiments, the groove may extend from the base of the emitter all the way to the apex of the cone tip (118), as shown in FIG. 14E. In other embodiments, the groove angle will be between 40° and 120°. In even other embodiments, the emitter will have a roughened surface (120) to promote capillary function, as shown in FIG. 14F. Likewise, in even more other embodiments, the emitter surface will be roughened and contain axial grooves.

Figure 15A:
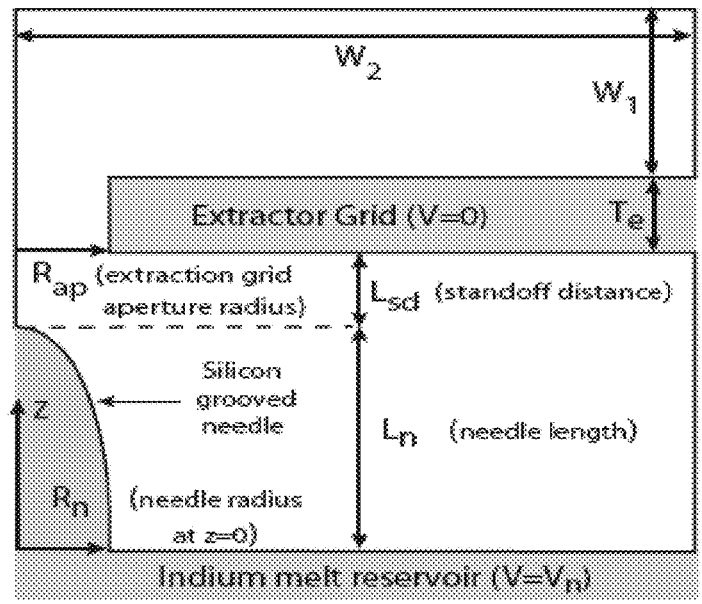
FIGS. 15A and 15B provide schematic diagrams of emitters and emitter grooves along with parameters for modeling flow along such grooves, in accordance with embodiments of the invention.
Figure 15B:
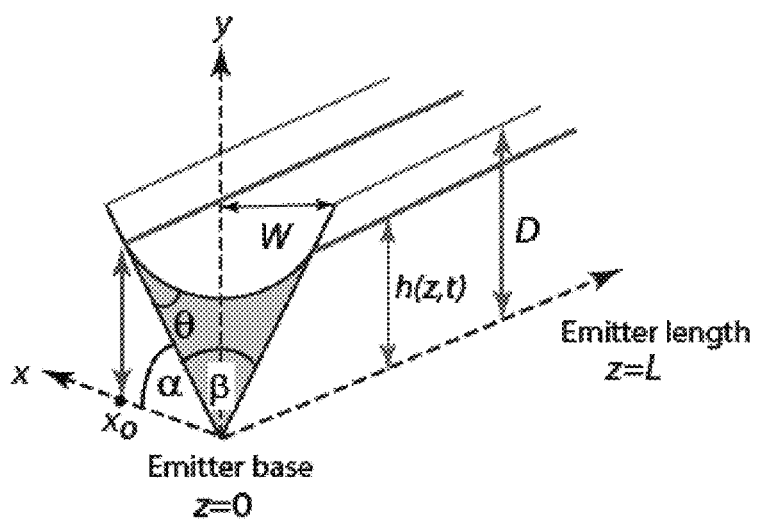
Figure 15C:
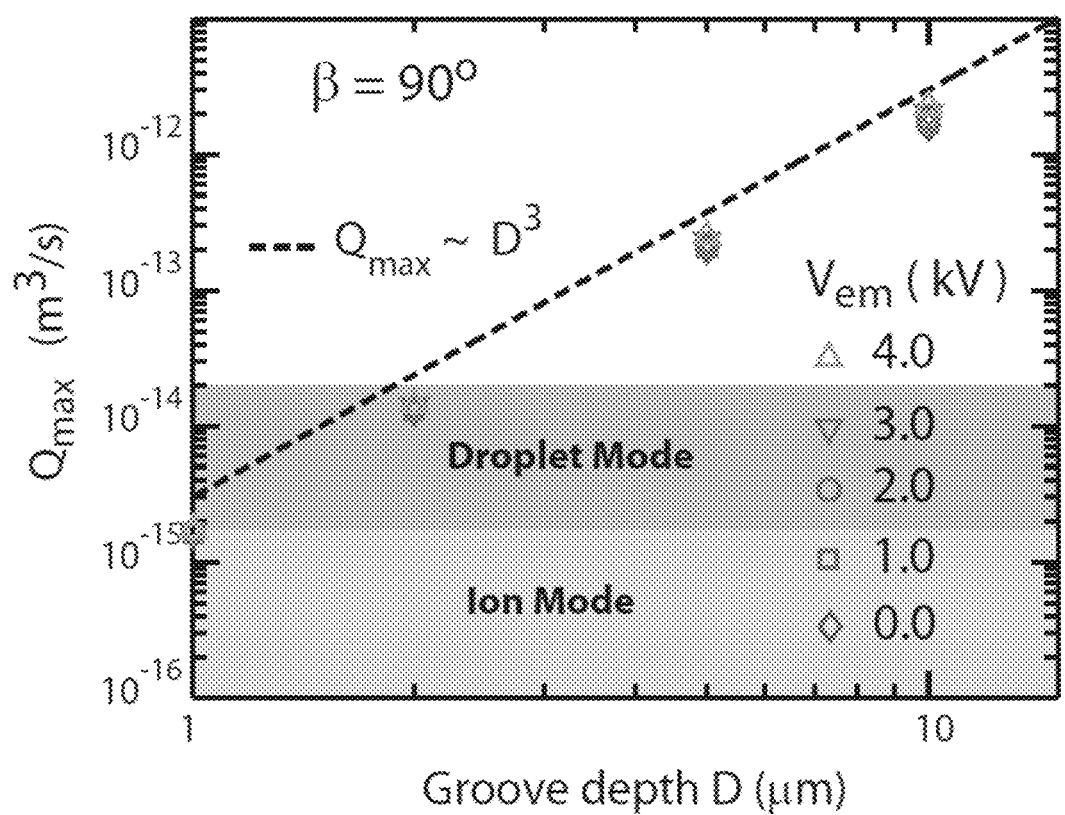
FIG. 15C provides a data graph showing indium flow rate in relationship to groove depth at various voltage extractions, in accordance with embodiment of the invention.
Figure 15D:
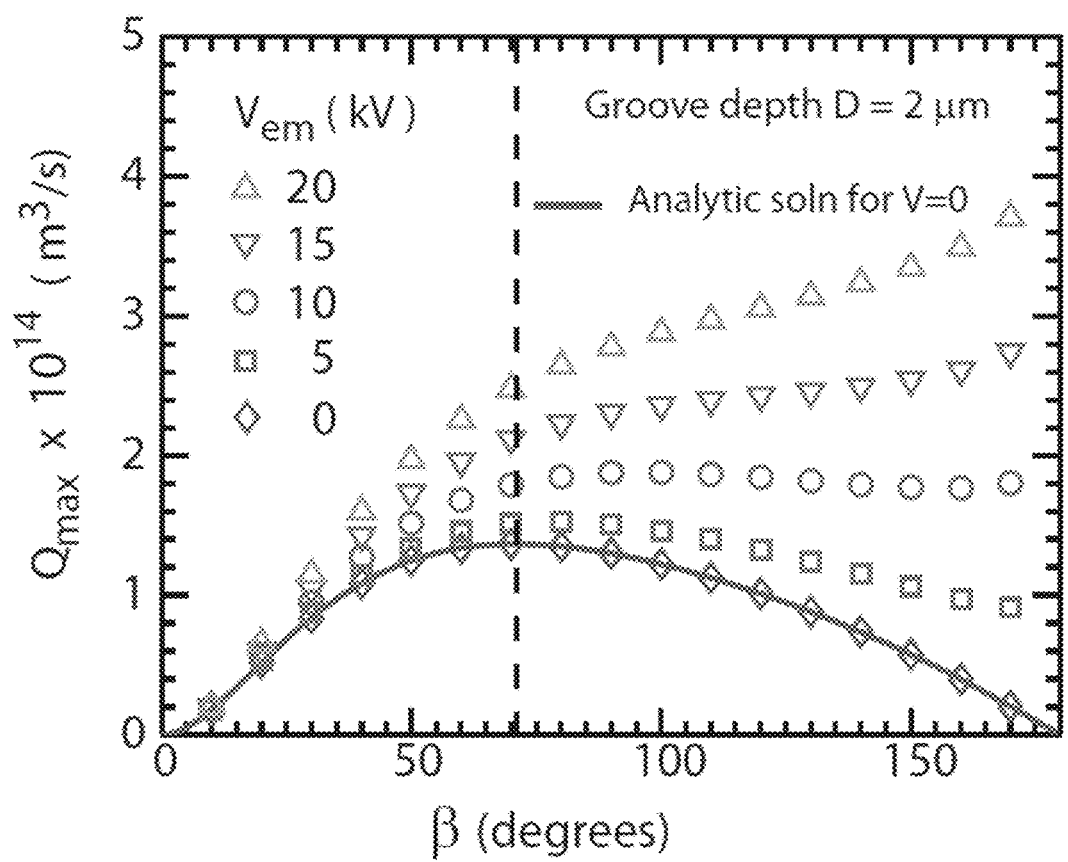
FIG. 15D provides a data graph showing indium flow rate in relationship to groove angle at various voltage extractions, in accordance with embodiments of the invention.

Emitter arrays with axial grooves of various depths have been microfabricated and tested. FIG. 15 provides data on the flow of indium in axial grooves in accordance with modeling undertaken to determine the design of grooves capable of supporting the desired flow rates. The hydrodynamic model describes the flow of a thin liquid film within a V-groove of constant cross section and subject to both capillary and Maxwell forces. As shown in FIGS. 15A and 15B for a parabolic type emitter shape, the model variables include the emitter grid aperture radius ($R_{ap}$), needle exterior shape, needle length ($L_{em}$), needle base radius ($R_n$), needle groove depth (D) and opening angle (β), the standoff distance ($L_{sd}$), the voltage difference ($V_n$) between the reservoir and extractor grid, the initial film shape within the groove [h(z,t)] and the initial film thickness where the needle meets the nanowick liquid reservoir. Shown in FIG. 15C are the results for the maximum steady state flux (in m³/s) attainable for the parameter values specified for a single groove. Fluxes in excess of this will lead to grooves which overfill with indium which is to be avoided for good flow control. As evident for the groove depths shown, a single needle such as this can handle typical flow rates spanning from ion to droplet mode. The design of the needles can be modified accordingly to take into account N identical grooves providing the flux. Shown in FIG. 15D are the predictions of the maximum flux attainable as a function of the V-groove opening angle β for a single groove of depth 2 microns subject to emitter voltages shown. In the absence of any electric field effects (i.e. pure capillary wicking in grooves), the model allows one to solve for the analytic solution shown in blue. This model may also predict flow in tapered channels (i.e. grooves of non-constant cross section). Time dependent flow to mimic periodic emission of droplets as well film recession and drainage resulting from electric field turnoff may also be examined as a function of needle geometry and groove depth. In the absence of electric field effects, the main determinant of the flux is the film thickness in the V-groove which scales roughly as $D^3$. The modeling results show that 2 micron deep grooves with a length of 400 microns are capable of providing much more (>73×10⁻⁶ mg/s) than the required 15×10⁻⁶ mg/s for 10 µA of current. Furthermore, the data suggest that 2 micron deep grooves with angles between 40° and 120° provide the highest flow rates. Accordingly, in some embodiments, the depth of the grooves is between 2 and 30 microns. In other embodiments the grooves have angles between 40 and 120°.

Although specific embodiments of micro-emitter and micro-emitter arrays have been described in the above sections, it will be understood that combinations and variations of the configurational parameters disclosed and described in association with the exemplary emitters and arrays may be utilized without departing from the scope of the disclosure. In addition, although specific emitter and propellant materials are described it will be understood that alternative materials suitable for the construction and operation of such emitters and emitter arrays may also be utilized without departing form the scope of the disclosure.

In addition, although the above embodiments have been describe in relation to the integration of micro-emitters and micro-emitter arrays in association with electrospray propulsion systems, it should be understood that such emitters and arrays may also be configured for use in association with metal deposition and etch sputter sources. In such embodiment the propellant would be replaced with the metal source for deposition or the ion etching material. It will be understood that in such embodiments the operating temperature and or extractor voltage may be altered from those utilized in propulsion systems as appropriate to ensure the emissions from the emitter and emitter array provide the desired depositional or etching characteristics.

Turning now to the method of microfabrication of an emitter array, in several embodiments procedures are provided to create arrays with features to provide optimal microfluidic propulsion within a thruster. In more embodiments, protocols are directed at propellant fluid passage (or through-via) formation with suitable characteristics to allow liquid flow from below the substrate onto the top surface of the substrate. In even more embodiments, other protocols are directed at emitter formation with suitable characteristics to promote uniform and stable Taylor cone and jet formation on the emitter tips across the array.

Figure 16:
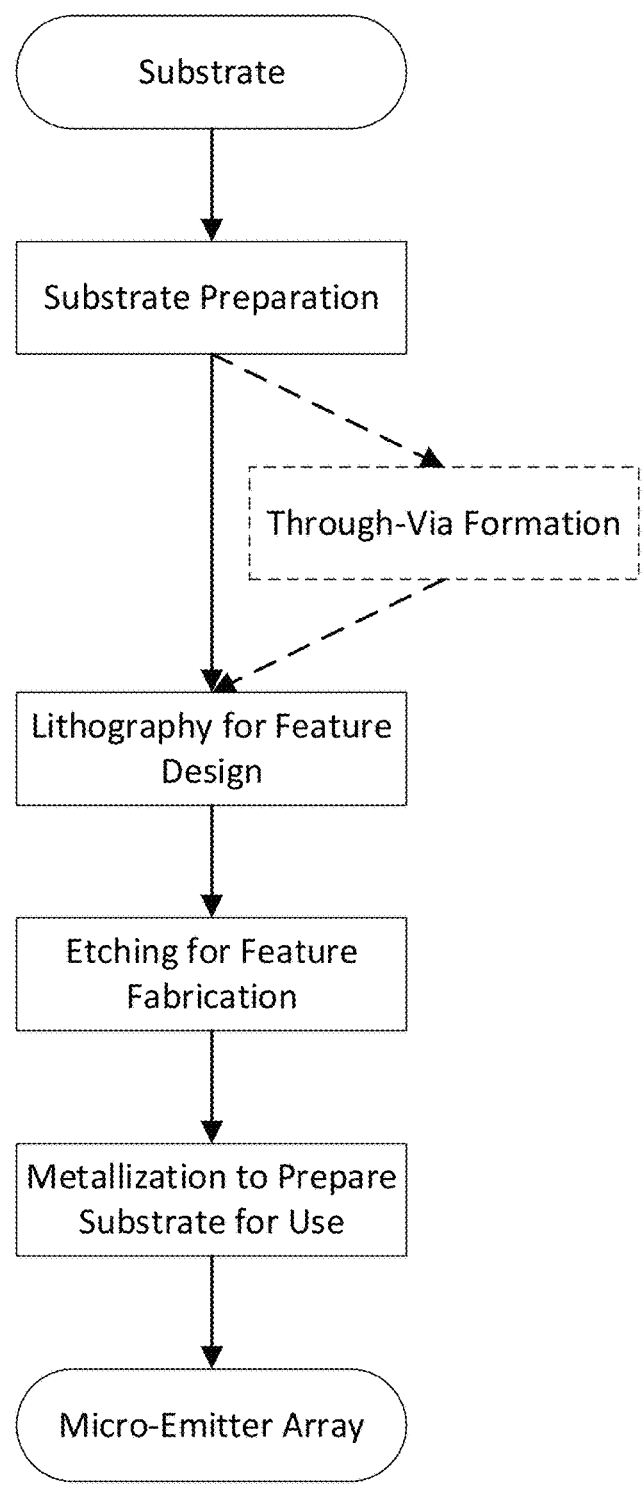
FIG. 16 provides a flow chart for a process of forming an emitter array in accordance with embodiments of the invention.

In many embodiments a process for microfabricating an emitter is provided. As shown in the flowchart in FIG. 16 in some embodiments initially an oxide, nitride, and/or other reactive functional-group may be used to form a pattern-enabling or hard mask layer or layers is grown onto the substrate with appropriate thickness to prepare for lithography and etching. It should be understood with respect to the formation of the functional-group layers that any suitable technique may be used such as, for example, thermal oxidation and/or low pressure chemical vapor deposition. The thick functional-group layer is essential to form emitters with the necessary height, as previously described. Once functional-groups are grown, through-via and/or emitter features can be fabricated by lithography and etching. The final step in the fabrication process is to metallize the emitter to prepare the substrate for use within a microfluidic propulsion system. The emitter can be metallized by sputtering a layer of film on the front and backside as a wetting layer. A second layer of material can be sputtered onto the front and backside of emitter as well, acting as the passivation layer. These wetting layers may be formed of any material suitable for encouraging the wetting of the substrate with the propellant, such as, for example, titanium or gold. A thick layer of propellant, such as, for example, indium, is deposited and preloaded on the front side.

Figure 17:
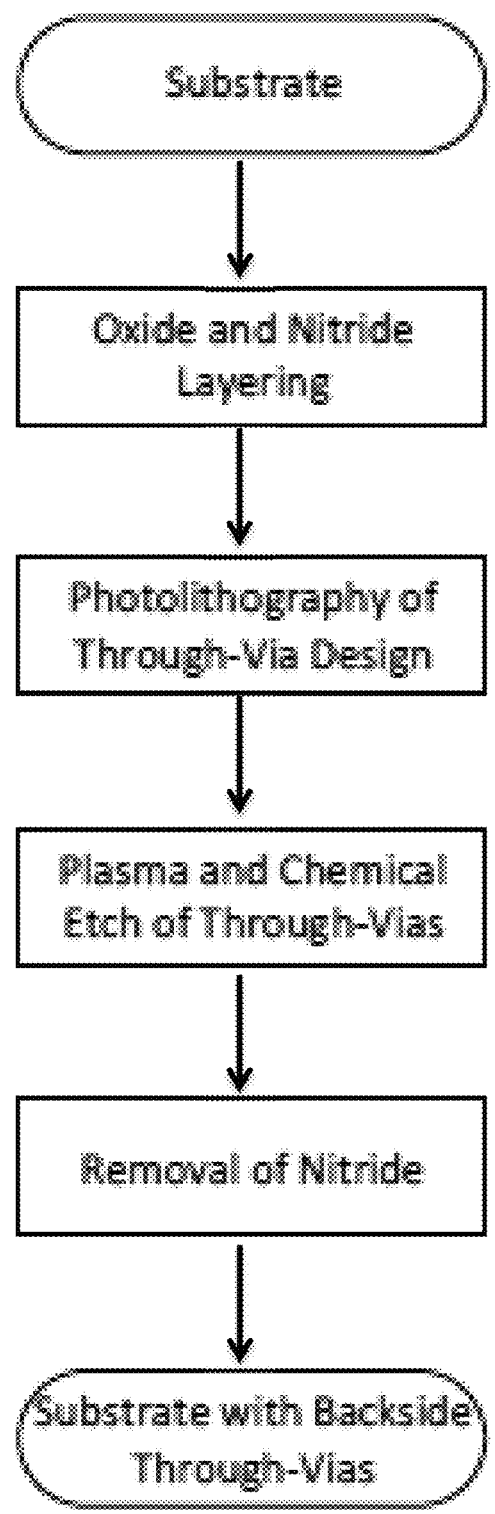
FIG. 17 provides a flow chart for a process of forming through-vias in accordance with embodiments of the invention.

In regards to the optional process to form propellant fluid passages or through-vias, a flowchart is exemplified in FIG. 17. In the exemplified embodiment, the silicon substrate is first layered with a thick oxide and a subsequent nitride layer. Once the substrate is coated, the propellant fluid passages are patterned on the outer layer with UV-photolithography. The desired pattern is then plasma etched into the nitride layer with gas chemistries such as, for example, the combination of $CHF_3$ and $O_2$. This exposes the underlying oxide layer. Subsequently, these small regions of the exposed oxide layer are etched down to the silicon substrate with another etch, this time using an aqueous solution of HF. It should be noted to those skilled in the art that a plasma etch could also be used. Once the silicon substrate is exposed, passages are etched through the silicon chemically with a hydroxide solution, such as, for example KOH. To prepare for subsequent emitter fabrication, the entire nitride layer is removed with plasma etching or wet chemical etching in hot phosphoric acid.

Figure 18:
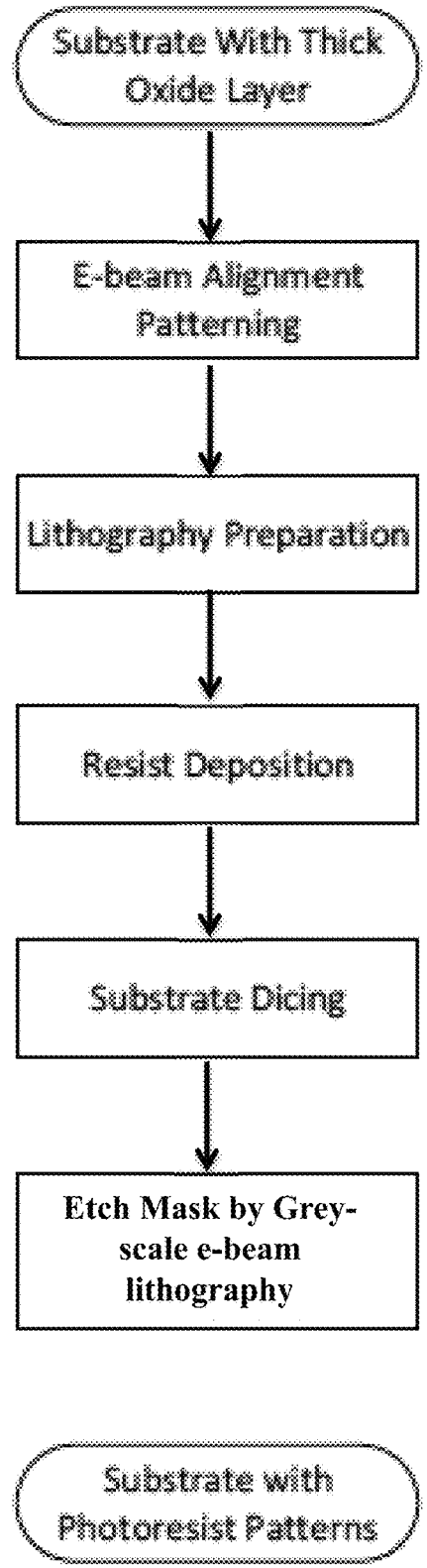
FIG. 18 provides a flow chart for a process of lithography in the forming of an emitter array in accordance with embodiments of the invention.

Once the fluid passages or through-vias are formed, emitter features can be microfabricated with lithography and deep reactive-ion etching processes. Or, alternatively, the emitter features can be fabricated directly after functional-group layer growth. An exemplified embodiment of a lithography process to pattern emitter arrays is depicted in FIG. 18. In many embodiments a silicon substrate with a thick oxide layer is coated with photoresist, exposed to UV, and the photoresist is developed. Thin metal layers such as titanium and gold are subsequently evaporated on the substrate to create alignment marks which prepares the substrate for the subsequent grey-scale e-beam lithography. After the alignment marks are fabricated, polymethylglutarimide (PMGI) resist is deposited onto the substrate-oxide of the top side, coating the resist to a depth of approximately 10 microns thick. The precise thickness of the resist depends on the required height of the emitters. The substrate with oxide and PMGI resist coatings is then diced in single emitter array chips to be patterned in the lithography system and processed. Once the substrate is diced, grey-scale e-beam lithography patterns the photoresist to design the features of the emitters. This step is important for specifying the number of grooves in the emitters, the sidewall angles and taper, etc. Now, the substrate is prepared for an etching process.

In one embodiment of grey-scale lithography, a polymeric material such as PMGI is coated onto the oxide layer on the silicon substrate. When exposed to a beam of energetic electrons, some of the chemical bonds in the PMGI are broken. As these bonds are broken, the PMGI starts to become more soluble in certain types of developer solutions. The degree of increased solubility is proportional to the total amount of electron beam exposure. Thus, a three-dimensional pattern can be created in the PMGI material by first exposing the PMGI with an electron beam lithography machine (e.g. JEOL 9300) and then developing the PGMI for a carefully calibrated period of time. The places in the PMGI that are exposed for a long period of time (high electron beam dose) will be "low spots" in the pattern (e.g. grooves) because they will be dissolved away quickly in the developer solution. The places in the PMGI that are unexposed (or only exposed for a short period of time (low or zero electron beam dose) will be "high spots" in the pattern (e.g. emitter tips) because they will not dissolve as easily in the PMGI.

Once this 3D pattern is formed in the PMGI, the 3D pattern is transferred into the oxide layer by plasma etching. This takes place because the PMGI acts as a masking layer for the oxide. As the oxide etch proceeds, the PMGI is also attacked by the plasma and slowly erodes away. Because the PMGI is at different heights, the "high spots" will take longer to erode than the "low spots", and therefore the oxide will also ultimately have high and low spots in the same places. Thus, the 3D pattern is transferred from the PMGI into the oxide.

Once the 3d pattern is formed in the oxide, the oxide is used as an erodible masking layer for the DRIE etching of the silicon. High spots in the oxide become high spots in the silicon, such as the emitter tips. Low spots in the oxide become the grooves in the sides of the emitter, for example. In addition, the presence of the erodible hard mask allows for multiple taper angles to be fabricated into the emitters. This is because the completely exposed area (no oxide present) can be etched at one angle, and the covered area (some oxide present) can be etched at a second angle. Thus, the grey-scale technique provides a considerable amount of flexibility in the design and fabrication of the emitters.

Figure 19:
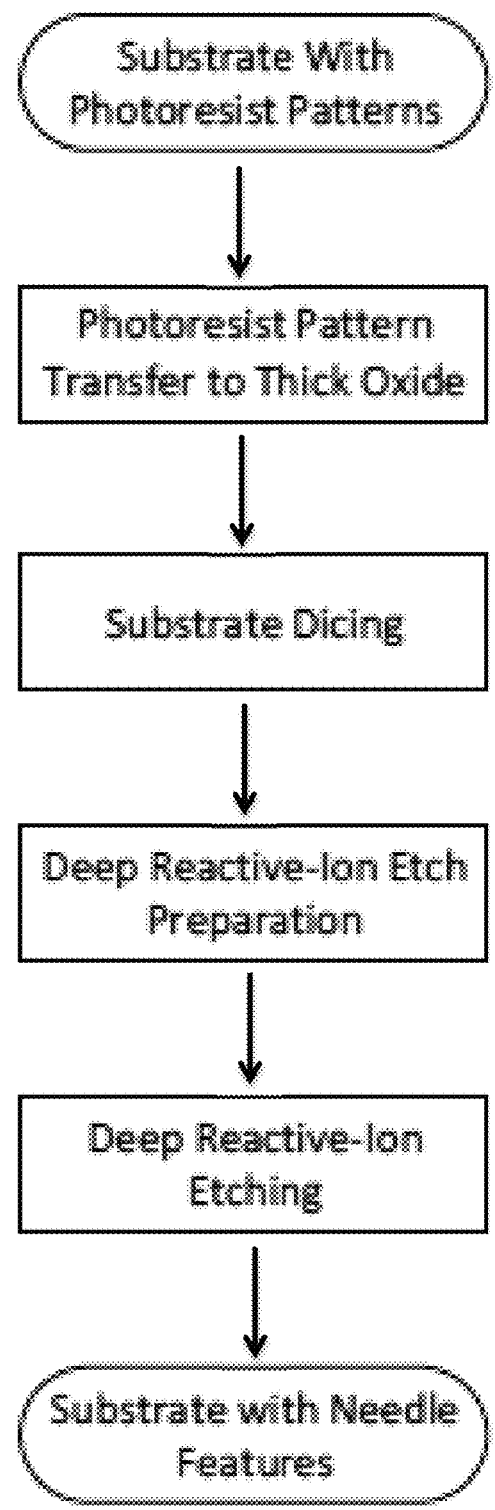
FIG. 19 provides a flow chart for a process of etching in the forming of an emitter array in accordance with embodiments of the invention.

An embodiment of a deep reactive-ion etch (DRIE) process is exemplified as a flowchart in FIG. 19. A photoresist pattern in the PMGI layer of a silicon substrate coated with thick oxide is transferred to the oxide layer by etching with plasma, such as, for example, $CHF_3$ with $O_2$. Next, the oxide layer is diced off on all sides, except the topside with the PMGI resist. Once the substrate is diced, the emitter array is etched into shape by DRIE etching, using $SF_6$, $C_4F_8$, and Ar as etching gases. The array is cleaned with acetone and isopropanol, then etched with $O_2$ plasma to remove all solvents prior to bonding Exemplary Embodiments The person skilled in the art will recognize that additional embodiments according to the invention are contemplated as being within the scope of the foregoing generic disclosure, and no disclaimer is in any way intended by the foregoing, non-limiting examples Several exemplary embodiments of micro-emitters and arrays were fabricated, as shown in FIG. 20. The emitters according to the embodiments comprise many of the features described to facilitate stable LMIS Taylor cone formation at the needle tip apex, including proper height, shape, and surface texture. In the embodiments, the emitters are composed of silicon and silicon-oxide. As shown, the exemplary emitter in FIG. 20A is tapered, with an approximate base diameter of 150 microns, a shaft diameter of 40 microns, and height over 200 microns. Rounded axial grooves extend from the emitter base to the edge where the sidewall and cone tip meet. The degree of the cone half-angle is approximately the same as the Taylor half-angle.

Another exemplary embodiment of an emitter and emitter array is depicted in FIG. 20B. In this embodiment emitters are formed having straight-walls, with a side-wall angle near 90°, and a smooth surface. The emitter diameter is approximately 180 microns and the height is near 400 microns. In addition, the emitter heights in the array are fairly uniform. FIG. 20C depicts another exemplary embodiment of a straight-wall emitter. The emitter comprises a diameter of approximately 150 microns, a height over 350 microns, and rounded axial grooves that extend from emitter base to the edge where the cone and sidewall adjoin. An additional exemplary embodiment of a straight-wall emitter is depicted in FIG. 20D. This emitter, with an approximate diameter of 150 microns and a height over 350 microns, comprises V-shaped axial grooves that extend from the base all the way to the cone apex. In FIG. 20E, an exemplary embodiment of a cone tip on a tapered emitter is shown. This cone tip has rounded axial grooves that extend to the tip apex, with a cone half-angle greater than the Taylor half-angle.

Figure 21:
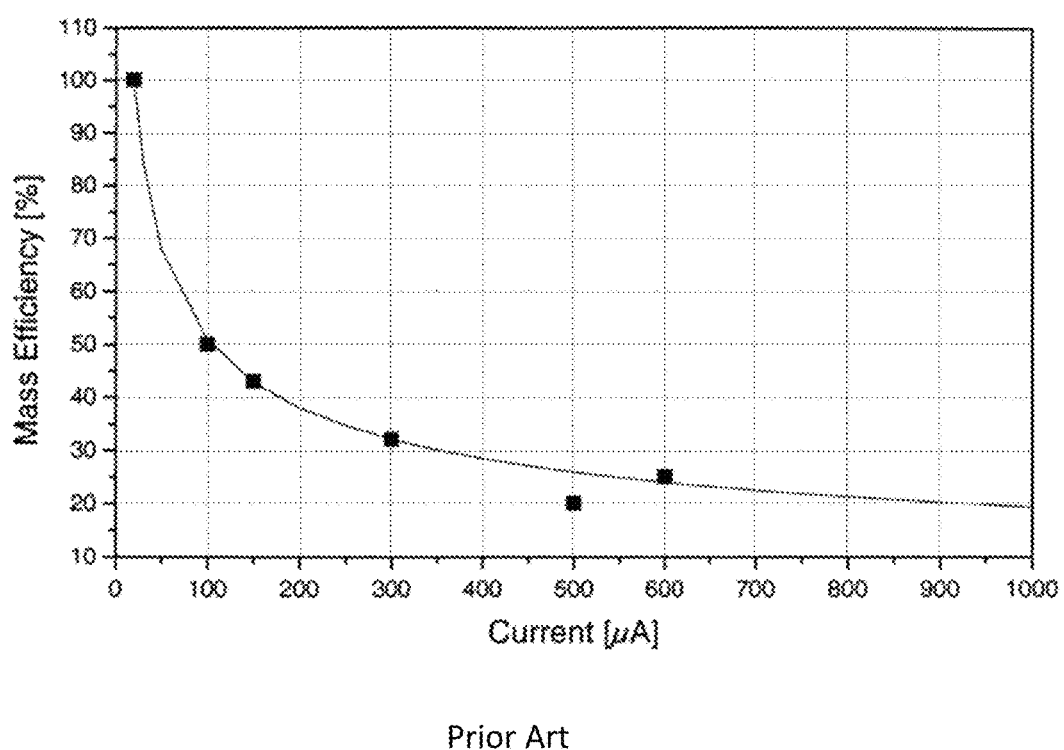
FIG. 21 provides a data graph showing mass efficiency vs. current for exemplary prior art emitters.

Embodiments of the described microfabricated emitter and micro-emitter arrays have been constructed and tested to determine performance capabilities. The arrays were developed to operate at 200 µN in the MEP thruster. And the emitters are designed to operate at 5-10 µA/emitter. FIG. 21 shows that the propellant mass efficiency decreases quickly at current levels greater than 20 µA. (These data are taken from M. Tajmar, A. Genovese, and W. Steiger, Journal of Propulsion and Power, Vol. 20, No. 2, March-April 2004, the disclosure of which is incorporated herein by reference.) Single e-beam emitter data in FIG. 1 verify that they can operate up to 20 µA/emitter while meeting the operating voltage requirement of <4 kV and the extractor current requirement of <1% of the emitter current from a 336 micron tall emitter with 10 micron deep round grooves and a 1-2 micron tip radius. The emitter array data in FIG. 1 and stability data taken validated that an array can provide scalable currents to greater than 1600 µA for a 100 µN thrust range at <4 kV. Accordingly, these tests demonstrate that the target operation of these emitters according to embodiments at <20 microamperes/emitter with a target of 5-10 uA for the 100-200 µN thruster is obtainable using this fabrication approach.

Single e-beam emitter data acquired also verify that emitters formed in accordance with embodiments can meet the performance requirements. They can operate at 10 µA currents at <4 kV extraction voltages. They can even operate at up to a 20 µA/emitter current output while meeting the operating voltage requirement of <4 kV and the extractor efficiency requirement of <1% of the emitter current.

Figure 22:
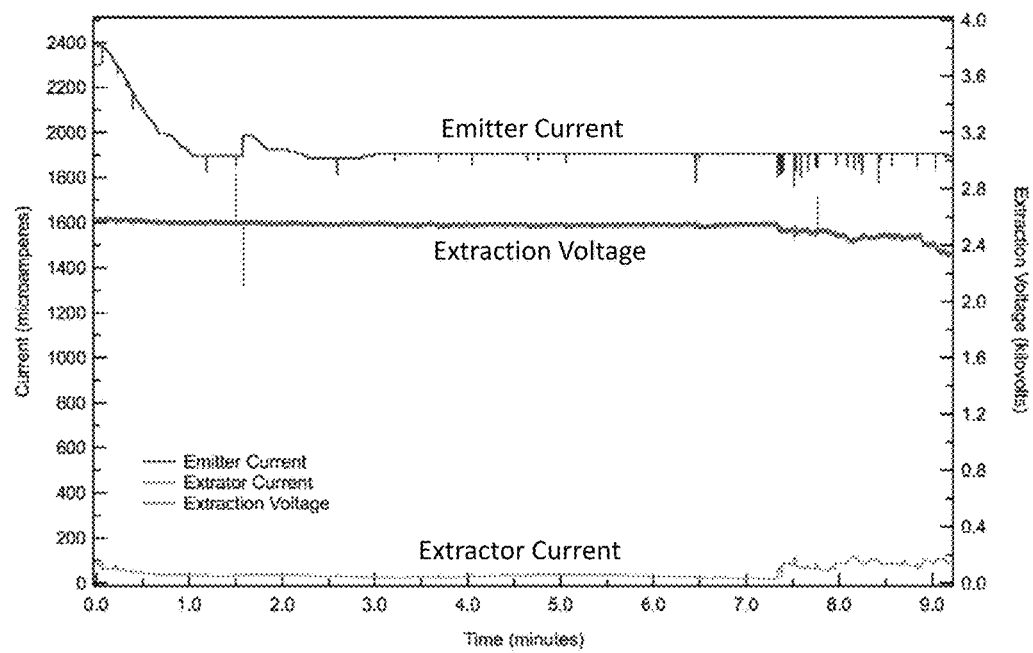
FIG. 22 provides a data graph showing performance characteristics of emitter arrays in accordance with embodiments of the invention.

Prototype thruster emitter arrays were also tested for total current, voltage, stability and extractor efficiency with several mg of indium having been loaded by thermal evaporation. The tests demonstrate that that a 25 µN thrust level at 400 µA can be achieved at <4 kV with <1% of the emitter current intercepted by the extractor with a 400 emitter array for 60 minutes, when over 90% of the propellant was exhausted. Post-test inspection of the emitters revealed that no extractor tungsten was detectable on them. Prototype thruster data of another embodiment of an emitter array (FIG. 22) in a prototype thruster show that the 100 µN thrust level at 1600 µA can be achieved at <4 kV with <2% of the emitter current intercepted by the extractor. These data both validate the emitter array fabrication process and the emitter features, and demonstrate the need for emitter array uniformity in height and tip angle to achieve the required design as described in Table 1 to increase efficiency, decrease contamination, and increase lifetime.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A micro-emitter array comprising:
a substrate having a top surface and a bottom surface;
emitters disposed on the top surface of the substrate, each of the emitters formed of an elongated body having a first end disposed proximal to the top surface of the substrate and a second end disposed distal the top surface of the substrate, wherein an apex of the second end forms a tip portion;

an extractor grid having a plurality of thrust emission openings disposed above the respective tip portion of each the of the emitters and separated therefrom by an extractor gap, the extractor grid configured to apply an extraction voltage to the micro-emitter array;

a source of propellant in fluid communication with the emitters, wherein the propellant flows from the source up each elongated body and is ejected from the respective tip portion thereof when the extraction voltage is applied to the emitters;

wherein the respective elongated body of each emitter has a height such that an electric field strength supplied by the extractor grid is at least one order of magnitude greater at the tip portion than at the first end;

wherein the tip portion has a conformation such that a single Taylor cone forms on the apex of at least a majority of the emitters when the extraction voltage is applied across the micro-emitter array; and wherein the height has a variance between emitters of no greater than ±10 microns such that when the extraction voltage is applied across the micro-emitter array, Taylor cones are formed on the tip portion of a majority of the emitters, the Taylor cones emitting a propellant jet having an emission profile such that the propellant emitted from each of the emitters is directed through a corresponding emission opening on the extractor grid.

2. The micro-emitter array of claim 1, wherein a wall angle formed between a side wall of the elongated body of each of the emitters and the top surface of the substrate is sufficiently perpendicular to allow maximum packing density of the emitters on the substrate surface.

3. The micro-emitter array of claim 2, wherein the wall angle is from between 65 to 90 degrees.

4. The micro-emitter array of claim 1, wherein a spacing distance between adjacent emitters is sufficiently large to prevent interference of propellant disposed on the adjacent emitters.

5. The micro-emitter array of claim 1, wherein a distal tip portion elongated body comprises an angular tip having a tip half-angle of greater than 49 degrees.

6. The micro-emitter array of claim 5, wherein the tip half-angle is 55 degrees with a variance of plus or minus 5 degrees.

7. The micro-emitter array of claim 1, wherein the tip portion of each elongated body is flat.

8. The micro-emitter array of claim 7, wherein the second end of each of elongated body has a radius of between 1 and 5 microns.

9. The micro-emitter array of claim 1, wherein each elongated body further comprise at least one elongated groove that extend axially from the first end of each elongated body at least partially up a side wall of each elongated body.

10. The micro-emitter array of claim 9, wherein the at least one elongated groove has a groove angle of from 40 to 120 degrees.

11. The micro-emitter array of claim 9, wherein the at least one elongated groove extends from the first end to the tip portion of each elongated body.

12. The micro-emitter array of claim 9, wherein the at least one elongated groove has one of either a "V" or a rounded shaped cross-section.

13. The micro-emitter array of claim 9, wherein the at least one elongated groove has a depth of at least 2 to 30 microns.

14. The micro-emitter array of claim 9, wherein each elongated body comprises a plurality of grooves.

15. The micro-emitter array of claim 1, wherein the height of each elongated body is at least 280 microns.

16. The micro-emitter array of claim 1, further comprising a plurality of fluid passages formed between the top surface and the bottom surface.

* * * * *